United States Patent Office 3,487,068
Patented Dec. 30, 1969

3,487,068
LINCOMYCIN-2-PHOSPHATES, 7-SUBSTITUTED COMPOUNDS AND SALTS THEREOF
Walter Morozowich, Kalamazoo, and Donald J. Lamb, Portage, Mich., assignors to The Upjohn Company, Kalamazoo, Mich., a corporation of Delaware
No Drawing. Filed Dec. 16, 1966, Ser. No. 602,116
Int. Cl. C07d 99/04, 27/04; A61k 21/00
U.S. Cl. 260—210
17 Claims

ABSTRACT OF THE DISCLOSURE

This invention relates to novel compounds, to processes for preparing them, and to novel intermediates, and is particularly directed to novel antibacterial compounds of the formula:

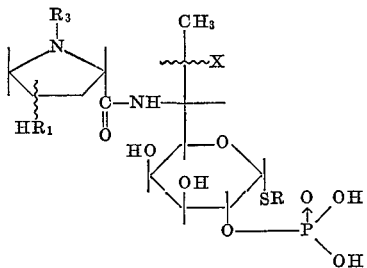

and the salts thereof.

BRIEF SUMMARY OF THE INVENTION

The novel compounds of the invention are represented by Formula I, wherein X is OH, chlorine, or bromine; R, and $HR_1$ are the same or different alkyl of not more than 20 carbon atoms, advantageously not more than 8 carbon atoms, cycloalkyl of from 3 to not more than 8 carbon atoms, or aralkyl of not more than 12 carbon atoms, advantageously not more than 8 carbon atoms; and $R_3$ is hydrogen, alkyl of not more than 20 carbon atoms, advantageously not more than 8 carbon atoms, cycloalkyl of from 3 to not more than 8 carbon atoms, and aralkyl of not more than 12 carbon atoms, advantageously not more than 8 carbon atoms.

Examples of alkyl of not more than 20 carbon atoms (R, $HR_1$, and $R_3$) are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl and 3-cyclopentylpropyl. Examples of aralkyl are benzyl, phenethyl, α-phenylpropyl, and α-naphthylmethyl.

The compounds of the invention have essentially the same antibacterial spectrum in vivo as the antibiotic lincomycin and can be used for the same purposes as lincomycin. The compounds of the invention are particularly useful for oral administration to animals, including mammals, because they lack the bitter taste of lincomycin.

The novel compounds of this invention are prepared by condensing lincomycin or analogs thereof with an aromatic aldehyde to produce 3,4-O-arylidene lincomycin, tritylating this compound, if it contains a 7-hydroxy group, to form 7-O-trityl-3,4-O-arylidene lincomycin, phosphorylating this compound to form the corresponding 3,4-O-arylidene lincomycin-2-phosphate, and removing the protective groups to form lincomycin-2-phosphate or analogs thereof.

DETAILED DESCRIPTION

Lincomycin, methyl 6,8-dideoxy-6-(trans-1-methyl-4-propyl - L - 2-pyrrolidinecarboxamido)-1-thio-D-erythro-α-D-galactooctopyranoside, is an antibiotic obtained as an elaboration product of a lincomycin-producing actinomycete according to U.S. Patent 3,086,912. It has the following structural formula:

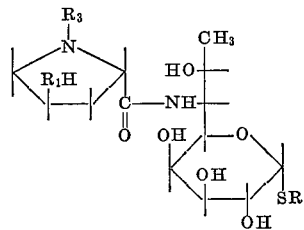

II wherein R and $R_3$ are methyl and $R_1H$ is propyl. Lincomycin B, methyl 6,8-dideoxy-6-(trans-1-methyl-4-ethyl-L-2 - pyrrolidine - carboxamido) - 1 - thio - D - erythro - α-D-galacto-octopyranoside (Formula II wherein R and $R_3$ are methyl and —$R_1H$ is ethyl) also is an elaboration product of the same microorganism when cultured according to the procedure given in U.S. Patent 3,086,912. Lincomycin C, ethyl 6,8 - dideoxy - 6 - (trans - 1 - methyl-4 - propyl - L - 2 - pyrrolidinecarboxamido) - 1 - thio - D-erythro - α - D - galacto - octopyranoside (Formula II wherein R is ethyl, —$R_1H$ is propyl, and $R_3$ is methyl) is obtained when the process of U.S. Patent 3,086,912 is carried out in the presence of added ethionine. Lincomycin D, methyl 6,8 - dideoxy - 6 - (trans - 4 - propyl - L-2 - pyrrolidinecarboxamido) - 1 - thio - D - erythro - α - D-galacto-octopyranoside (Formula II wherein R is methyl, —$R_1H$ is propyl, and $R_3$ is hydrogen) is obtained when the fermentation of U.S. Patent 3,086,912 is carried out in the presence of added α-MTL, methyl 6-amino-6,8-dideoxy-D - erythro - 1 - thio - α - D - galacto - octopyranoside, a compound obtained by the hydrazinolysis of lincomycin according to U.S. Patent 3,179,595. Methyl 6,8-dideoxy-6 - (trans - 4 - ethyl - L - 2 - pyrrolidinecarboxamido) - 1-thio - D - erythro - α - D - galacto - octopyranoside (Formula II wherein R is methyl, —$R_1H$ is ethyl and $R_3$ is hydrogen) is also produced when α-MTL is added to the fermentation of U.S. Patent 3,086,912. Similarly, lincomycin K, ethyl 6,8 - dideoxy - 6 - (trans - 4 - propyl - L-2 - pyrrolidinecarboxamido) - 1 - thio - D - erythro - α-D-galacto-octopyranoside (Formula II wherein R is ethyl, —$R_1H$ is propyl, and $R_3$ is hydrogen) is produced when the fermenation of U.S. Patent 3,086,912 is carried out in the presence of added α-ETL, ethyl 6-amino-6,8-dideoxy - D - erythro - α - thio - D - galacto - octopyranoside, a compound obtained by the hydrazinolysis of lincomycin C. Ethyl 6,8-dideoxy-6-(trans-4-ethyl-L-2-pyrrolidinecarboxamido)-1-thio - D - erythro-α-D-galacto - octopyranoside (Formula II wherein R is ethyl, —R₁H is ethyl, and R₃ is hydrogen) is also obtained when α-ETL is added to the fermentation of U.S. Patent 3,086,912. The above-described N-methyl products which are obtained when α-MTL and α-ETL are added to the fermentation process of U.S. Patent 3,086,912 are examples of compounds of Formula II wherein R₃ is hydrogen. If desired, the N-hydrogens can be replaced, by procedures to be described later, to produce N-analogs, e.g., methyl 6,8-dideoxy-6-(trans - 1 - ethyl - 4 - propyl - L - 2 - pyrrolidinecarboxamido) - 1 - thio - D - erythro - α - D - galacto - octopyranoside or ethyl 6,8 - dideoxy - 6 - (trans - 1 - methyl - 4 - ethyl - L - 2 - pyrrolidinecarboxamido) - 1 - thio - D-erythro - α - D - galacto - octopyranoside or ethyl 6,8-dideoxy - 6 - (trans - 1 - ethyl - 4 - ethyl - L - 2 - pyrrolidinecarboxamido) - 1 - thio - D - erythro - α - D - galacto-octopyranoside or methyl 6,8 - dideoxy - 6 - (trans-1 - ethyl - 4 - ethyl - L - 2 - pyrrolidinecarboxamido) - 1-thio-D-erythro-α-D-galacto-octopyranoside.

Lincomycin or any of the compounds of Formula II which has the D-erythro configuration can be converted to the L-threo configuration by converting the 7-hydroxy group to a 7-oxo group and then back again to a 7-hydroxy group. A suitable procedure for this purpose is illustrated in the following sequence:

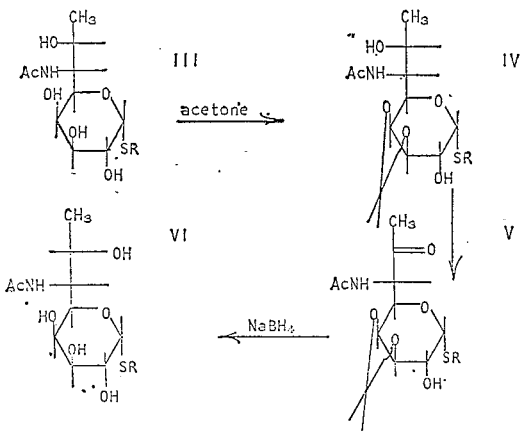

For example, lincomycin on treatment with acetone in the presence of p-toluene sulfonic acid is converted to 3,4-O-isopropylidenelincomycin which on oxidation with chromic oxide gives 7-oxo-3,4 - O - isopropylidenelincomycin (methyl 6,8-dideoxy - 3,4 - O - isopropylidene-6-(trans-1-methyl-4-propyl-L-2-pyrrolidinecarboxamido)-1-thio - D-glycero-α-D-galacto - octanopyranos - 7 - uloside which on treatment with sodium borohydride is converted to 7-epilincomycin (methyl 6,8 - dideoxy - 6 - (trans - 1 - methyl - 4 - propyl - L - 2 - pyrrolidinecarboxamido) - 1 - thio-L - threo - α - D - galacto - octopyranoside). Any of the compounds of Formula II having a D-erythro configuration can be converted to the corresponding L-threo configuration by this procedure.

Lincomycin and other compounds of Formula II, as well as the 7-epimers thereof, can be prepared by acylating a compound of the formula:

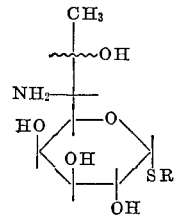

VII wherein R is as given above with a 4-substituted-L-2-pyrrolidine-carboxylic acid of the formula:

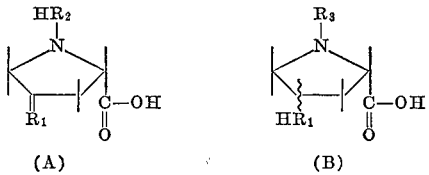

wherein HR₁ and R₃ are as given above, HR₂ equals R₃, and R₁ is alkylidene of not more than 20 carbon atoms (including methylene, advantageously not more than 8 carbon atoms, cycloalkylidene of from 3 to not more than 8 carbon atoms, or aralkylidene of not more than 12 carbon atoms, advantageously not more than 8 carbon atoms). Examples of alkylidene, cycloalkylidene, and aralkylidene groups (R₁ and R₂) include methylene, ethylidene, propylidene, butylidene, pentylidene, hexylidene, heptylidene, octylidene, nonylidene, decylidene, undecylidene, dodecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2 - cyclopropylethylidene, 3 - cyclopentylpropylidene, benzylidene, 2 - phenylethylidene, 3 - phenylpropylidene, and α-naphthylmethylidene.

This acylation and like acylations referred to herein can be effected by procedures already well known in the art for acylating amino sugars. The starting acid of Formula A can be prepared by reacting a 4-oxo compound of the formula:

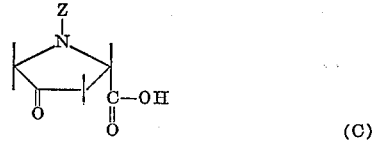

wherein Z is a protective hydrocarbyloxycarbonyl group which is removable by hydrogenolysis, trityl, i.e., triphenylmethyl, diphenyl(p - methoxyphenyl)methyl, bis - (p-methoxyphenyl)phenylmethyl, benzyl, or p - nitrobenzyl with a Wittig agent, e.g., an alkylidenetriphenylphosphorane [see, e.g., Wittig et al., Ber., 87, 1348 (1954); Trippett, Quarterly Reviews, XVIII, No. 4, p. 406 (1963)]. Examples of hydrocarbyloxycarbonyl groups (Z) are tertiary - butoxycarbonyl; benzyloxycarbonyl groups of the formula:

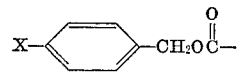

wherein X is hydrogen, nitro, methoxy, chloro, or bromo, for example, carbobenzoxy, p - nitrocarbobenzoxy, p-bromo-, and p - chlorocarbobenzoxy; and phenyloxycarbonyl groups of the formula

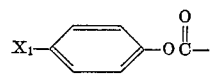

wherein X₁ is hydrogen, allyl, or alkyl of not more than 4 carbon atoms, such as phenyloxycarbonyl, p - tolyloxycarbonyl, p-ethylphenyloxycarbonyl, and p-allylphenyloxycarbonyl and the like.

In carrying out this process the 4-oxo-L-2-pyrrolidinecarboxylic acid (Formula C) is added to a freshly prepared Wittig reagent. The Wittig reagents herein used can be generally represented by the following formula:

$R_1 = P(C_6H_5)_3$ wherein R₁ is as given above. These Wittig reagents are prepared by reacting an alkyl, cycloalkyl, or aralkyltriphenylphosphonium halide with a base such as sodamide, or sodium or potassium hydride, or the sodium or potassium metalate of dimethylsulfoxide and the like. For example, the elimination of hydrogen halide from alkyltriphenylphosphonium halide, produces alkylidenetriphenylphosphorane. [The preparation of phosphoranes is discussed in detail by Trippett, Quart. Rev., XVII, No. 4, p. 406 (1963).] The reaction is generally carried out in an organic solvent, such as benzene, toluene, ether, dimethylsulfoxide, tetrahydrofuran, or the like, at temperatures between 10° C. and the reflux temperature of the reaction mixture. The thus-obtained product, a 4-alkylidene-, 4 - cycloalkylidene-, or 4 - aralkylidene - 1 - protected-L-proline which has the following formula:

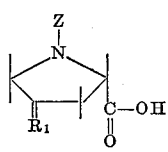
(D)

is recovered from the reaction mixture in a conventional manner, generally by extraction from aqueous solutions of the reaction mixture. The crude product can be purified by conventional means, such as recrystallization, chromatography, or formation and recrystallization of easily formed derivatives such as amine salts of the amino acid, e.g., the dicyclohexylamine salt, and the like, and liberating the amino acids from such compounds. By hydrogenating an acid of Formula D in the presence of a catalyst, e.g., platinum, which is effective to saturate a double bond, but which is ineffective to effect hydrogenolysis, a compound of the following formula:

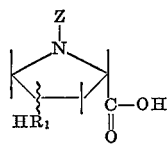
(E)

is obtained. Platinum deposited on a carrier, e.g., carbon or an anion exchange resin Dowex-1, a cross-linked polystyrene trimethyl benzylammonium resin in the hydroxide cycle is suitable. If desired, the starting compounds of Formula VII can be acylated with acids of Formula A, B, C, D, or E to form compounds of the formula:

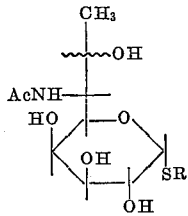
VIII to give compounds VIIIA, VIIIB, VIIIC, VIIID, and VIIIE wherein Ac is the acyl group of an acid of Formulas A, B, C, D, and E, respectively. Compound VIIIC can then be converted to compound VIIID by treatment with a Wittig reagent and compound VIIID hydrogenated to compound VIIIE by the procedures given above. The hydrogenation, both of the acid D and the acylate VIIID, gives a mixture of cis and trans epimers which, if desired, can be separated by counter current distribution or chromatography. The starting acids of Formula B in which $R_3$ is hydrogen are obtained when an acid of Formula D or E is subjected to hydrogenolysis over a palladium catalyst, e.g., palladium on carbon. Likewise, compounds of Formulas VIIID and VIIIE are converted to compounds of Formula VIIIB in which $R_3$ is hydrogen by the same process.

When $R_3$ in Formulas B and VIIIB is hydrogen, it can be replaced by suitable alkylation or like procedure. Advantageously, this replacement is effected by reacting the compound according to Formula B or VIIIB, wherein $R_3$ is hydrogen with an oxo compound (an aldehyde or a ketone) and hydrogenating the resulting adduct with a catalyst effective to saturate an olefinic double bond. Either platinum or palladium can be used as the catalyst. Suitable oxo compounds have the formula $R_4R_5CO$ where $R_4R_5C=$ is the same as $R_2$ given above. Examples of suitable oxo compounds are formaldehyde, acetaldehyde, propionaldehyde, butyraldehyde, acetone, isobutylmethyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3-cyclopentanepropionaldehyde, cyclohexaneacetaldehyde, cycloheptanecarboxaldehyde, 2,2-dimethylcyclopropylacetaldehyde, 2,2-dimethylcyclopropyl methyl ketone, cyclopentyl methyl ketone, cyclobutyl methyl ketone, cyclobutanone, cyclohexanone, 4 - methylcyclohexanone, and the like. The starting acids of Formulas A and B wherein $HR_2$ and $R_3$ are hydrogen are obtained by treating an acid of Formula D or Formula E with hydrogen bromide in acetic acid to remove the Z group. The N-hydrogen can then be replaced with an $HR_2$ group by the procedure given above. Compounds of Formulas VIIID and VIIIE are converted to compounds of Formulas VIIIA and VIIIB, respectively, by the same process, first to compounds wherein $HR_2$ and $R_3$ are hydrogen and then to compounds wherein $HR_2$ and $R_3$ are other than hydrogen.

Either before or after this replacement of the hydrogen, the acid can be used to acylate the amino sugar of Formula VII. In the former case the N-hydrogen can be subsequently replaced.

Hydrogenation of the $R_1$ (ylidene) group results in a mixture of cis and trans isomers which if desired can be separated by counter current distribution or chromatography.

The various lincomycins and lincomycin analogs and isomers described above can be converted to 7-halo-7-deoxy-analogs. The replacement is effected advantageously by mixing the starting compound of Formula VII or VIII with thionyl chloride or Rydon reagent and heating. For example, when a compound of formula VIIIA (Ac in Formula VIII is that of the acid of Formula A) is used as the starting compound, an intermediate compound of the following formula

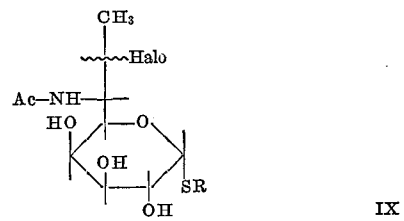
IX wherein R is as given above and Ac is the acyl radical of an acid of Formula A is obtained.

When this compound (Formula IX-A) or the starting compound (Formula VIIIA) is hydrogenated with a catalyst effective to saturate an olefinic double bond, a compound of Formula IXB is obtained as a mixture of cis and trans epimers according to the formulas:

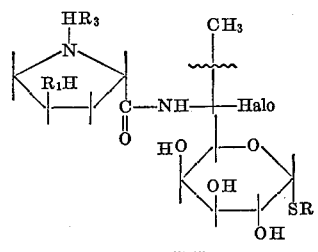
Trans IXB and

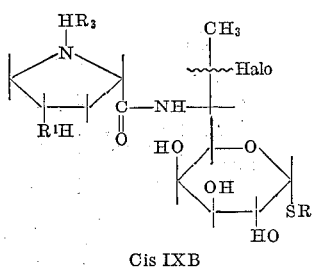

Cis IXB which, if desired, can be separated by counter current distribution of chromatography.

The mechanism by which the thionyl chloride on Rydon reagent effects the substitution of the 7-hydroxy by halogen is such that a change in configuration results. Thus, a 7-hydroxy compound of the D-erythro (7(R)) configuration yields a 7-halo compound of the L-threo (7(S)) configuration. Thus, halogenation of lincomycin gives 7(S)-halo-7-deoxylincomycin (sometimes referred to as 7-halo-7-deoxylincomycin) and halogenation of epilincomycin (methyl 6,8 - dideoxy-6-(trans-4-propyl-1-methyl-L-2-pyrrolidinecarboxamido)-1-thio-L-threo-α-D - galacto - octopyranoside) gives 7(R)-halo-7-deoxylincomycin (sometimes referred to as 7-halo-7-deoxy-epilincomycin).

Rydon reagents are formed by the addition of halogen to triphenylphosphine or triphenylphosphite or addition of an alkyl halide to triphenylphosphite can be represented by the formulas:

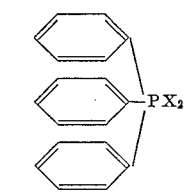

(F)

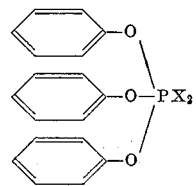

(G)

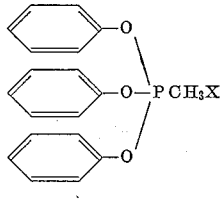

(H)

wherein X is halogen, e.g., chlorine or bromine. Rydon et al., J. Chem. Soc., 2224 (1953); ibid., 2281 (1954); ibid., 3043 (1956).

The Rydon reagent can be formed in situ by addition of halogen or methyl halide to a solution of the triphenylphosphine or triphenylphosphite in an inert solvent such as acetonitrile or dimethylformamide, or it can be isolated as a separate entity. In either case the reaction with the lincomycin or related compounds is effected by contacting the Rydon reagent therewith in an inert solvent, e.g., acetonitrile or dimethylformamide, until the desired substitution of the 7-hydroxy is obtained. The reaction takes place at ordinary temperature, though gentle heating can be effected if desired. Advantageously the temperature is maintained between about 20° C. and about 55° C. The product can be recovered from the reaction mixtures by well-known techniques such as filtration, solvent extraction, etc. The reaction mixture advantageously is heated with methanol to destroy any excess Rydon reagent, filtered to remove any solid such as triphenylphosphine oxide, formed in the reaction, and then treated to recover the product. The methanol can be added either before or after the filtration. Advantageously the treated and filtered reaction mixture is evaporaed to dryness and purified by solvent extraction and/or chromatography.

To effect the substitution of the 7-hydroxy by thionyl chloride, the starting compound of Formula VII or VIII, advantageously in the form of an acid-addition salt, e.g., the hydrochloride, is mixed with thinyl chloride, advantageously in the presence of an inert solvent, with mild heating, advantageously at reflux temperature, until the desired substitution of the 7-hydroxy group by chlorine is effected. Advantageously, the reaction is carried out in an inert atmosphere, e.g., under nitrogen. Carbon tetrachloride can be used effectively as the solvent vehicle but other inert solvents such as chloroform, methylene chloride, ethylene chloride, ether, benzene, and the like can be used. A satisfactory procedure is to stir the reaction mixture at room temperature for a considerable period, say from about 1 to 18 hours or as long as necessary to obtain a reasonably clear solution and then to raise the temperature to between about 50 and 100° C., for example, to the reflux temperature (77° C. for carbon tetrachloride). After the reaction is complete, usually after heating at reflux for about 1 to 5 hours, the reaction mixture is allowed to cool, advantageously under nitrogen. Any material that separates on the cooling is collected and dried. The solvent is removed by vacuum distillation at a pot temperature advantageously less than about 35° C. and the material which precipitates is collected and dried and treated with ethanol to convert any residual sulfite intermediates to the desired product. The collected material can then be further purified by solvent extraction and/or recrystallization and can be recovered either as the free base or an acid addition salt.

The proportions of the reagents can be varied widely. Stoichiometrically, however, at least 3 moles of thionyl chloride is required for each mole of starting comopund. Any larger amount can be used but ordinarly it is not necessary or desirable to use more than about a 10 fold excess. Advantageously, an excess of about 2 to 3 fold is used. The amount of solvent is not critical and can be varied widely in accordance with the practices in the art. Ordinarily from about 15 to about 30 volumes of solvent for each part of solid starting compound will suffice. The proportion of solvent to thionyl chloride, however, is important because of the solubility of the product in thionyl chloride. If the ratio of solvent to thionyl (v/v) is high, the desired product precipitates on cooling of the reaction mixture and the work up of the product is simplified. For example, with carbon tetrachloride a mixture of products precipitates directly on cooling the reaction mixture if the v/v proportion of carbon tetrachloride to thionyl chloride is kept above about 10 to 1.

As the biosynethtic-produced lincomycins, as well as the amino sugars derived therefrom, are either methyl or ethyl thioglycosides, it is sometimes desirable to convert them to higher or lower glycosides. It is also sometimes desirable to convert any of the compounds of Formulas VII, VIII or IX to higher or lower glycosides. This can effectively be accomplished by reacting the compound to be converted with a mercaptan of the formula $R_6SH$ wherein $R_6$ is an alkyl group of not more than 20 carbon atoms, but one different from R, for example, compounds of Formulas VIII and IX on reaction with a mercaptan of formula R₆SH produce dithiocetals of the formula

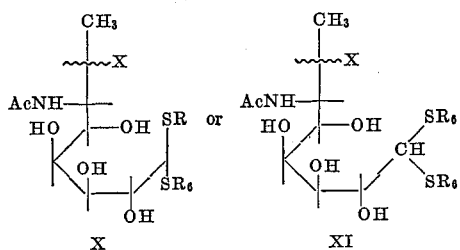

wherein X is hydroxy or halogen, which on treatment with acid and/or on heating is recyclized, to give a compound of the following formula

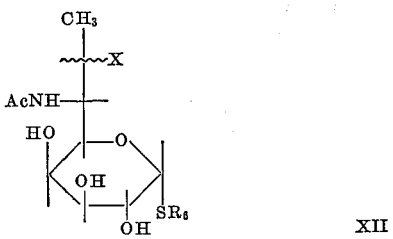

The process can be applied directly to any of the starting products of Formulas VIII, i.e., VIII–A, VIII–B, VIII–C, VIII–D, and VIII–E. The resulting products can be subjected to hydrazinolysis to form compounds of the following formula:

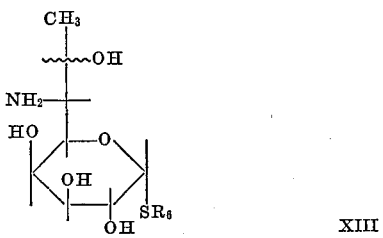

which can be N-acylated as described above with acids of Formulas A, B, C, D, and E to provide compounds according to Formula XII wherein X is hydroxy. The process can also be applied to the starting compounds of Formula VII. For example, α-MTL on treatment with ethyl mercaptan followed by recyclization as described above is converted to α-ETL.

An alternative process for making compounds of Formula XII or Formula XIII is to brominate the starting material and then react it with the mercaptan according to the following sequence:

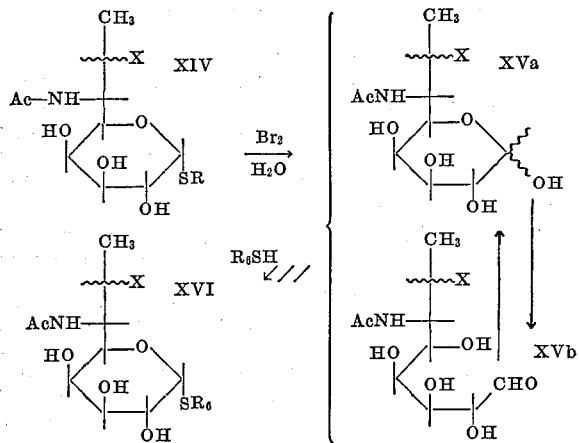

The starting compound, XIV, is dissolved in water as a soluble salt, e.g., the hydrochloride and bromine added with cooling advantageouslly to between about −10 and 20° C. It is sufficient if the aqueous solution is cooled to about 0° C. and the bromine added dropwise. The stoichiometric amount of bromine is 1 mole for each mole of starting compound, though more or less can be used. Advantageously a slight excess, say from 5 to 20% excess, of bromine is used. The bromine initially replaces the RS-group and the resulting intermediate hydrolyzes to the sugar in which the pyranose form XVa is in equilibrium with the aldose form XVb. In the presence of acid, e.g., hydrochloric acid or other strong non-oxidizing acid such as p-toluene sulfonic acid, and sulfonic acid type anion exchange resins, the mercaptan R₆SH reacts with the sugar XV to form the thioglycoside XVI. Concomitantly some diacetal of Formula X or XI may be formed which after separation can be cyclized as described above to form more of the desired thioglycoside XVI.

In carrying out the process of the subject invention, lincomycin or analogs thereof advantageously as the hydrochloride salt, is first condensed with an aromatic aldehyde, with the aid of mild heat, to form 3,4-O-arylidene lincomycin. Acid catalysis of the reaction is unnecessary if the hydrochloride salt of lincomycin is used as this provides sufficient catalysis of the reaction. The reaction is formed to completion through azeotropic removal of water by an organic solvent, for example, benzene, toluene, chloroform, ethylene chloride, and the like. The azeotrope-forming solvent can be eliminated if water is removed by some other means, such as by evacuation, vaporization with an inert gas, or merely by co-distillation with a solvent which has a higher boiling point than water. The azeotrope-forming solvent is used in admixture with a highly polar solvent, such as N,N-dimethylformamide, N,N-dimethylacetamide, dimethylsulfoxide, N-methyl pyrrolidone, and the like, in order to solubilize lincomycin hydrochloride and thus produce a homogeneous solution.

The condensation reaction can be conducted between temperatures of about 70° to 180° C.; the preferred temperature being about 90°–110° C. The optimum temperature depends on the ratio of polar to non-polar solvent, and on the specific properties of the non-polar solvent, such as the boiling temperature of the azeotrope formed with water as well as the boiling point of the non-polar solvent itself. The non-polar solvent containing moisture can be continuously removed by distillation and replaced periodically with fresh, dry solvent. The water also can be removed by condensation and separation with a water trap or a dessicant can be used, thus permitting the dried solvent to return to the reaction vessel.

The time for complete condensation of lincomycin hydrochloride with an aromatic aldehyde, as disclosed above, varies with the solvent composition, and the efficiency of removal of the water. When azeotrope-forming solvents are used, as described above, the course of the reaction can be followed by measuring the amount of water liberated. Alternatively, the reaction vessel can be sampled periodically and chromatographed. With solvent combinations of benzene and dimethylformamide, reaction times of about 1–16 hours can be used, with 2–3 hours being optimum. If anhydrous lincomycin hydrochloride is used, the reaction time required is reduced by approximatelly a factor of 1/2 since only one-half of the amount of water is liberated, compared with lincomycin hydrochloride monohydrate. A variety of aromatic aldehydes can be used in the process of the invention, for example, furfural, 5-methylfurfural, benzaldehyde, salicylaldehyde, m-tolualdehyde, o-tolualdehyde, p-tolualdehyde, o-chlorobenzaldehyde, m-chlorobenzaldehyde, m-bromobenzaldehyde, p-bromobenzaldehyde, p-methoxybenzaldehyde, m-methoxybenzaldehyde, o-methoxybenzaldehyde, 3,4 - dimethoxybenzaldehyde (veratric aldehyde), salicylaldehyde p-hydroxybenzaldehyde, 3,4,5-trimethoxybenzaldehyde, piperonal, o-nitrobenzaldehyde, p-chlorobenzaldehyde, phthaldehyde, m - nitrobenzaldehyde, p - nitrobenzaldehyde, β-naphthaldehyde, p-bromobenzaldehyde, o - bromobenzaldehyde, 2,4-dichlorobenzaldehyde, vanillin, terephthaldehyde, protocatechualdehyde, cinnamaldehyde.

Also useful are aldehydes in which the carbonyl group is separated from the aromatic moiety by one or more double bonds giving a conjugated structure of:

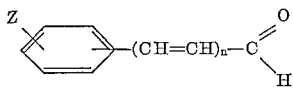

wherein $n$ can be an integer of from 1–4, and Z can be one of the following substituents on the aromatic moiety:

| | |
|---|---|
| $CH_3$ | $OC_2H_5$ |
| $CH_2CH_3$ | $O(CH_2)_2CH_3$ |
| $CH(CH_3)_2$ | $OCH(CH_3)_2$ |
| $C(CH_3)_3$ | $O(CH_2)_3CH_3$ |
| $3,4\text{-}(CH_2)_4$ | $O(CH_2)_4CH_3$ |
| $C_6H_5$ | $OC_6H_5$ |
| $CF_3$ | $OCOCH_3$ |
| $CN$ | $OH$ |
| $COCH_3$ | $SCH_3$ |
| $CO_2C_2H_5$ | $SC_2H_5$ |
| $CO_2H$ | $SCH(CH_3)_2$ |
| $CO_2$ | $SH$ |
| $CH_2Si(CH_3)_3$ | $SCOCH_3$ |
| $Si(CH_3)_3$ | $SCN$ |
| $Si(C_2H_5)_3$ | $SOCH_3$ |
| $Ge(CH_3)_3$ | $SO_2CH_3$ |
| $Ge(C_2H_5)_3$ | $SO_2NH_2$ |
| $Sn(CH_3)_3$ | $S(CH_3)_2^{\oplus}$ |
| $Sn(C_2H_5)_3$ | $SO_3^{\ominus}$ |
| $N_2^{\oplus}$ | $SeCH_3$ |
| $NHCOCH_3$ | $F$ |
| $N(CH_3)_3^{\oplus}$ | $Cl$ |
| $NO_2$ | $Br$ |
| $PO_3H^{\ominus}$ | $I$ |
| $AsO_3H^{\ominus}$ | $IO_2$ |
| $OCH_3$ | $CH=CHNO_2$ |

The acetals formed by the above-disclosed process are initially isolated as crystalline hydrochloride salts. With stable acetals, for exampde, 3,4-benzylidene lincomycin, and 3,4-p-chlorobenzylidene lincomycin, recrystallization of the hydrochlorides can be brought about with hot Methyl Cellosolve, dimethylformamide, chloroform, and the like. The less stable acetals, for example, 3,4-p-anisylidene lincomycin, 3,4-cinnamylidene, and 3,4-toluylidene lincomycin, must be converted to the free base form before isolation of the acetal.

The arylidene lincomycin hydrochloride salts can be converted to the free base by mixing the salts with a basic material, for example, aqueous sodium hydroxide, a quaternary ammonium hydroxide, ammonium hydroxide, or a strong amine base. Basic ion exchange resin can be used. The insoluble arylidene lincomycin base can be removed by filtration, or it can be extracted with water-immiscible solvents, for example, chloroform, methylene chloride, ethylene dichloride, ether and the like. Alternatively, the arylidene lincomycin hydrochloride salts can be converted to the free base by first neutralizing the salt with a base after placing the salt in solution in a solvent such as chloroform, dimethylformamide, dimethylacetamide, propylene glycol, and the like. The base can be an alkoxide, an amine, ammonia, or a solid inorganic base, for example, sodium hydroxide, potassium hydroxide, and the like. The resulting solutions of the arylidene lincomycin base can be recovered from water-miscible solvents by dilution with water to the cloud point resulting in slow crystallization of the acetals. The solutions of arylidene lincomycin base in water-immiscible solvents can be recovered by dilution of the solution with a nonpolar solvent, for example, hexane, isomeric hexanes, and the like, or by simply evaporating the solvent. The latter procedure for forming the free base from the arylidene lincomycin hydrochloride salts is suitable for isolating the very labile acetals of lincomycin, since a nonaqueous procedure can be employed.

Most of the arylidene lincomycin bases can be purified by solution of the compound in acetone, diluting the solution with ether, and then adding hexane to the cloud point to induce spontaneous crystallization.

Trityl ethers of 3,4-O-arylidene lincomycin are prepared by reacting an excess of trityl halide, or substituted trityl halide with 3,4-arylidene lincomycin in the presence of a strong base and a suitable solvent. The preferred mole ratio of trityl halide or substituted trityl halide to 3,4-arylidene lincomycin is 4:1. Higher ratios of tritylating agent to 3,4-arylidene lincomycin can be used (up to about 10:1), although increasing amounts of di-tritylated by-products are formed with a large excess of tritylating agent. Lower mole ratios of tritylating agent to 3,4-arylidene lincomycin (below 1:1) result in an incomplete reaction, as well as formation of additional unidentified by-products.

The preferred trityl halide in the above reaction is trityl chloride. However, other trityl halides and substituted trityl halides of the following formula can be used:

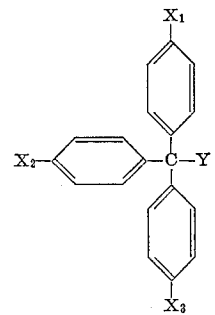

wherein Y is selected from the group consisting of Cl and Br and $X_1$, $X_2$, and $X_3$ are selected from the group consisting of hydrogen, halogen, and $OCH_3$.

The compounds of the type in which the substitutents $X_1$, $X_2$, and $X_3$ are mono-, di-, or tri-para chloro may be made by the methods reported by Gomberg [Ber., 37, 1633 (1904)]. The corresponding compounds in which $X_1$, $X_2$, and $X_3$ are para methoxy may be prepared by the methods described by Smith et al., and references therein [J. Am. Chem. Soc., 84, 430 (1962), see p. 436].

The preferred solvent for the tritylation is acetone. Other solvents which can be used are 2-butanone, 2-pentanone, 3-pentanone, ether, benzene, N,N-dimethylformamide, N,N-dimethylacetamide, dimethylsulfoxide, methyl acetate, ethyl acetate, pyridine, and the like. Use of the higher boiling polar solvents, however, results in the production of additional by-products from the reaction; whereas the lower boiling solvents do not permit a complete reaction.

The preferred base is triethylamine. Other strongly basic tri-alkyl amines ean be used, for example, triethylene-diamine, N-alkylmorpholine derivatives, tripropylamine, tributylamine, and the like. Tertiary bases having a pKa greater than 8 permit a more rapid reaction since better solubility of the arylidene lincomycin is maintained. Weaker bases, such as pyridine, require longer reaction times since arylidene lincomycin is largely insolubilized as the hydrochloride salt in the presence of such a base.

The reaction time is determined by several factors, for example, the boiling point of the solvent, the strength of the base, the concentration and ratio of trityl halide to 3,4-arylidene lincomycin, and the polarity of the solvent. For example, with the following mole ratio of trityl chloride to anisylidene lincomycin to triethylamine to acetone of 72:15:16:34, the preferred reaction time at reflux temperature is 24 hours. Reaction times up to 48 hours can be used although increasing amounts of 2,7-di-O-trityl-3,4-O-anisylidene lincomycin are formed. Reaction times less than six hours result in appreciable amounts of unchanged anisylidene lincomycin. With other mole ratios, the operating reaction time can range from 1 to 100 hours.

Upon completion of the tritylation reaction, the product 7-O-trityl-3,4-O-arylidene lincomycin is precipitated by the addition of a nonpolar solvent such as hexane, heptane, pentane, cyclohexane, benzene, and the like. The crude reaction product is repeatedly recrystallized from hot acetonitrile and finally from hot acetone-water (1:1) mixture to provide a pure preparation of 7-O-trityl-3,4-O-arylidene lincomycin. Other organic solvents can be used for recrystallization, for example, 2-butanone, 3-pentanone, n-propanol, 2-propanol, butyl acetate, benzene, butyronitrile, N,N-dimethylformamide-water, N,N-dimethylacetamide-water, methanol-water, ethanol-water, and the like.

7-O-trityl-3,4-O-arylidene lincomycin can be phosphorylated by processes already well known in the art, for example, by reacting it with a phosphorylating agent in the presence of an acid-binding agent, for example, a tertiary amine, to produce 7-O-trityl-3,4-O-arylidene lincomycin-2-phosphate. Suitable phosphorylating agents include phosphoryl trichloride ($POCl_3$) dianilinophosphoro-chloridate, anilinophosphorodichloridate, di-t-butylphosphorochloridate, dimorpholinophosphorobromidate, and cyanoethylphosphate plus dicyclohexylcarbodiimide. Suitable tertiary amines include heterocyclic amines such as pyridine, quinoline, and isoquinoline; trialkylamines such as trimethylamine, triethylamine, triisopropylamine, and the like; N,N-dialkylanilines such as dimethylaniline, diethylaniline, and the like; and N-alkylpiperidines such as N-ethylpiperidine, N-methylpiperidine, and the like. The preferred base is pyridine.

The phosphorylation is advantageously conducted by treating a solution of 7-O-trityl-3,4-O-arylidene lincomycin or 3,4-O-arylidene-7-halo-7-deoxylincomycin, or analogs in a tertiary amine, for example, pyridine, with a phosphorylating agent, for example, phosphoryl chloride, and cooling the reaction mixture to prevent excessive side reactions. Advantageously, the reaction is conducted in pyridine at low temperatures, preferably −38° to −42° C. Temperatures between −50° C. and +10° C. are allowable although appreciable amounts of sideproducts sometimes arise at higher temperatures. The resulting 2-phosphorodichloridate is hydrolyzed (quenched) with water to the corresponding phosphate ester at temperatures between −40° C. and +10° C. Low temperatures are preferred in order to minimize side-products. Thus, upon reacting 7-O-trityl-3,4-O-anisylidene lincomycin in the presence of a tertiary amine with at least 1 mole of phosphorylating agent, there is obtained 7-O-trityl-3,4-O-anisylidene lincomycin-2-phosphate, and upon similarly reacting 3,4-O-anisylidene 7-chloro-7-deoxylincomycin, there is obtained 3,4-O-anisylidene 7-chloro-7-deoxylincomycin-2-phosphate.

Lincomycin-2-phosphate can be prepared from 7-O-trityl-3,4-arylidene lincomycin-2-phosphate by the selective removal of the trityl and arylidene groups; and 7-halo-7-deoxylincomycin-2-phosphate from 3,4-arylidene 7-halo-7-deoxylincomycin-2-phosphate by the selective removal of the arylidene group. The removal of these protective groups can be accomplished by a mild acid hydrolysis. For example, 7-O-trityl-3,4-O-anisylidene lincomycin-2-phosphate and 3,4-O-anisylidene 7-chloro-7-deoxylincomycin-2-phosphate on being heated with 80% acetic acid at 100° C. for one-half to one hour yield respectively lincomycin-2-phosphate and 7-chloro-7-deoxylincomycin-2-phosphate. Acids such as formic, propionic, dilute hydrochloric and dilute sulfuric can also be used.

The desired 2-phosphate can be isolated from the reaction mixture by various techniques well known in the art or by following the special techniques illustrated with reference to lincomycin-2-phosphate. A suitable procedure is to subject the reaction mixture to gradient elution ion-exchange chromatography on quaternary ammonium resins such as Dowex 1-X2. A linear gradient of water, pH 9, going to ammonium acetate pH 9 will separate lincomycin-2-phosphate from other by-products. The lincomycin-2-phosphate peak is collected and freeze-dried. Ammonium acetate is removed with heat and inorganic phosphate is removed by saturating an aqueous solution of lincomycin-2-phosphate with ammonia gas to precipitate di-ammonium phosphate. Lincomycin-2-phosphate is obtained by freeze-drying the above aqueous solution to provide the mixed ammonium salts. Hemiammonium lincomycin-2-phosphate is obtained by heating the above salt at 100° for three hours. The zwitterionic form of lincomycin-2-phosphate free of ammonia is obtained by heating the ammonium salt at 118–120° for 8–24 hours under high vacuum and crystallizing the zwitterionic form.

An alternative procedure is to remove the inorganic phosphates before the acid-hydrolysis. This has the advantage that the lincomycin-2-phosphate sometimes can be crystallized directly without the necessity of going through the ammonium salt form.

The sequence of the above reactions starting with lincomycin can be shown as follows:

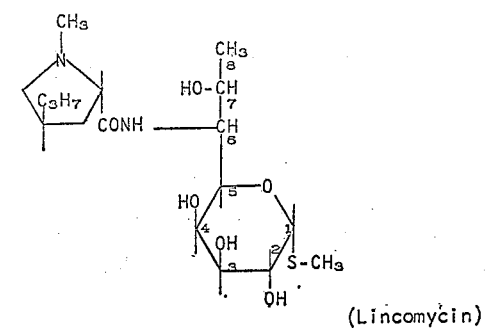

(Lincomycin)

(Condensation with Aromatic Aldehyde)

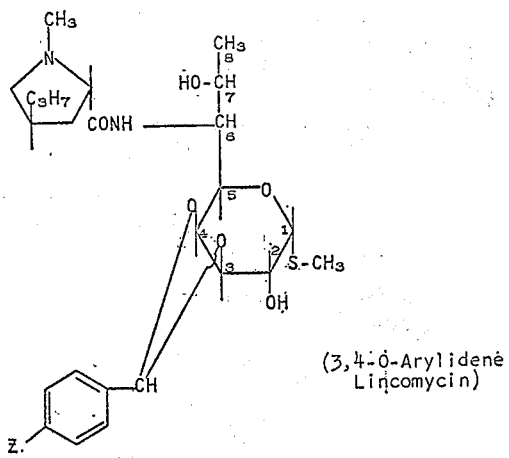

(3,4-O-Arylidene Lincomycin)

(Tritylation with Trityl Halide)

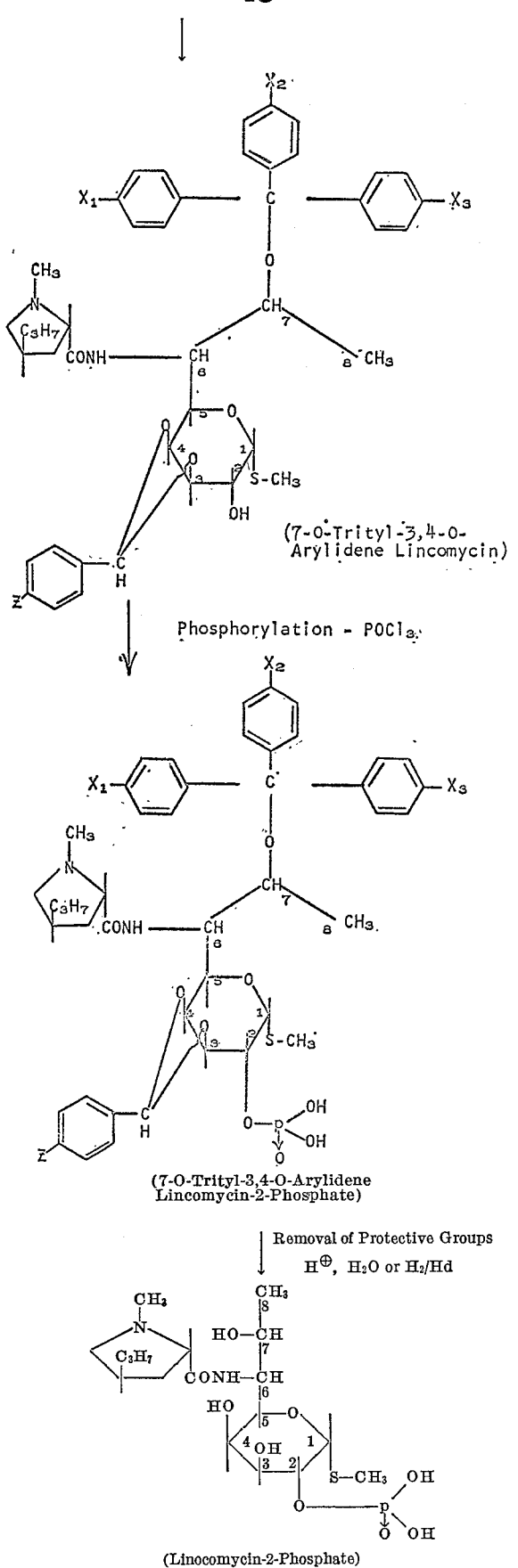

(7-O-Trityl-3,4-O-Arylidene Lincomycin)

Phosphorylation – POCl$_3$.

(7-O-Trityl-3,4-O-Arylidene Lincomycin-2-Phosphate)

Removal of Protective Groups
H$^\oplus$, H$_2$O or H$_2$/Hd (Lincomycin-2-Phosphate)

The novel compounds of the invention are amino acids and can exist in a protonated or a non-protonated form according to the pH of the environment. At low pH the compounds exist in the acid-addition salt form, at a higher pH in a zwitterion form, and at a still higher pH in a metal salt form. The latter can be a neutral salt (two equivalents of base for each mole of lincomycin-2-phosphate), an acid or mono salt (one equivalent of base for each mole of lincomycin-2-phosphate), or a hemi salt (one-half equivalent of base for each mole of lincomycin-2-phosphate. By addition of appropriate amounts of suitable acids and bases, any of these various forms can be isolated. The acid addition salts include those of hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids. Acid and neutral salts include the alkaline metal (including ammonia) and alkaline earth metal (including magnesium) salts obtained by neutralizing an acid form with the appropriate base, for example, ammonium hydroxide, sodium and potassium hydroxides, or alkoxides, calcium, or magnesium hydroxides, and the like. The acid and neutral salts also include amine salts obtained by neutralizing an acid form with a basic amine, for example, mono-, di-, and trimethylamines, mono-, di-, and triethylamines, mono-, di-, and tripropylamines (iso- and normal), ethyldimethylamine, benzyldiethylamine, cyclohexylamine, benzylamine, dibenzylamine, N,N'-dibenzylethylenediamine, bis-(ortho-methoxy-phenylisopropyl)amine, and like lower-aliphatic, lower-cycloaliphatic, and lower-araliphatic amines, the lower-aliphatic and lower-cycloaliphatic radicals containing up to and including eight carbon atoms; heterocyclic amines such as piperidine, morpholine, pyrrolidine, piperazine, and the lower-alkyl derivatives wherein lower alkyl contains one to eight carbon atoms, inclusive thereof such as 1-methylpiperidine, 4-ethylmorpholine, 1-isopropylpyrrolidine, 1,4-dimethylpiperazine, 1-n-butylpiperidine, 2-methylpiperidine and 1-ethyl-2-methylpiperidine; amines containing water solubilizing or hydrophilic groups such as mono-, di-, and triethanolamines, ethyldiethanolamine, n-butyl-monoethanolamine, 2-amino-1-butanol, 2-amino-2-ethyl-1,3-propanediol, 2-amino-2-methyl-1-propanol, tris-(hydroxymethyl)-aminomethane, phenylmonoethanolamine, p-tertiaryamylphenyldiethanolamine, and galactamine, N-methylglucamine, N-methylglucosamine, ephedrine, phenylphrine, epinephrine, and procaine; tetraethylammonium hydroxide; and guanidine. The various forms can be used interchangeably but for most purposes the zwitterion form and the hemi-ammonium salt form are preferred.

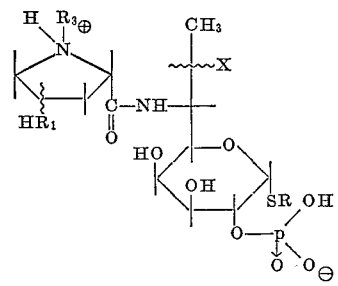

The following examples are illustrative of the process and products of the present invention, but are not to be construed as limiting. Parts and percentages are by weight unless otherwise specified.

EXAMPLE 1

*Lincomycin-2-phosphate*

PART A–1.—3,4-O-ANISYLIDENE LINCOMYCIN HYDROCHLORIDE AND 3,4-O-ANISYLIDENE LINCOMYCIN BASE

A solution of 47.0 gm. (0.1 mole) lincomycin-hydrochloride hemihydrate dissolved in a mixture of 125 ml. dimethylformamide, 75 ml. anisaldehyde and 160 ml. benzene was heated in a bath at 140° C. The benzene-water azeotrope was allowed to distill at 105–110° C., and upon collecting each 50 ml. of distillate, an additional 50 ml. dry benzene was added. Crystallization of 3,4-O-anisylidene lincomycin hydrochloride occurred after 100 ml. of distillate was collected, and, after an additional 250 ml. of distillate was collected, the reaction flask was allowed to cool to room temperature. The pale brown reaction mixture was treated with 200 ml. of ether, and the solids were isolated by filtration and washed with ether. After drying the solids at 40° C. in vacuo, the yield of crude white 3,4-O-anisylidene lincomycin hydrochloride was 43.0 gm. A portion of this hydrochloride salt was converted to the free base as follows: A suspension of 21.0 gm. of 3,4-O-anisylidene lincomycin hydrochloride in 150 ml. of water was shaken with 15 ml. of 2 N sodium hydroxide in a separatory funnel. The curdly product of 3,4-O-anisylidene lincomycin base was extracted with four 400 ml. portions of ether. The ether extracts were combined, dried with sodium sulfate, and concentrated to 100 ml. by distillation. After standing in the refrigerator overnight, the white needle-like crystals of 3,4-O-anisylidene lincomycin base were removed by filtration and washed with ether-hexane 1:1. The crystals were dried in vacuo; yield, 13.2 grams. An additional 4.7 grams of 3,4-O-anisylidene lincomycin base was obtained by adding hexane to the mother liquor to give a total recovery of 17.9 grams.

*Analysis.*—Calcd. for $C_{26}H_{40}N_2O_7S$: C, 59.53; H, 7.69; N, 5.34; S, 6.10; eq. wt., 524.63; $H_2O$, 0. Found: C, 59.77; H, 7.66; N, 5.34; S, 6.17; eq. wt., 524; $H_2O$, 0.

$[\alpha]_D^{25°}$ +96° (1.08%, EtOH). $\lambda_{max.}$ 95% EtOH 226.5 m$\mu$ ($\epsilon$ 14,775).

PART B–1.—7-O-TRITYL-3,4-O-ANISYLIDENE LINCOMYCIN

A solution of 8.0 g. (15.2 mmoles) 3,4-O-anisylidene lincomycin, prepared as in Part A–1, in 25 ml. acetone was treated with 16 g. triethylamine and 20 g. (72 mmoles) trityl chloride, in the order given. The reaction flask was fitted with a condenser and calcium chloride tube and the mixture was refluxed for 24 hours. Trityl chloride dissolved upon heating to reflux and triethylamine hydrochloride slowly crystallized out. The crystallized triethylamine hydrochloride from the above reaction was removed by filtration and the remaining brown filtrate was diluted first with 100 ml. cyclohexane, and then with 350 ml. hexane to incipient turbidity. The mixture was allowed to stand at room temperature overnight. The resulting yellow crystals of crude 7-O-trityl-3,4,-O-anisylidene lincomycin were isolated by filtration, washed with hexane, and air dried; yield, 9.4 g. A portion of this material, 9.3 g., was dissolved in 100 ml. acetonitrile. The solution was partly decolorized with 1.0 g. of activated carbon. Upon concentration of the solution by distillation to 30 ml., spontaneous crystallization of 7-O-trityl-3,4-O-anisylidene lincomycin occurred. These crystals were isolated by filtration and recrystallized twice from acetonitrile; yield, 6.45 g. of pale yellow crystals of 7-O-trityl-3,4-O-anisylidene lincomycin. This preparation was dissolved in 160 ml. hot acetone and the solution was diluted with 140 ml. hot (50° C.) water to incipient turbidity. Crystallization of 7-O-trityl-3,4-O-anisylidene lincomycin rapidly occurred. After cooling the reaction mixture at 0° C. for one hour, white crystals of 7-O-trityl-3,4-O-anisylidene lincomycin were isolated by filtration, washed with acetone-water (1:2) and air dried; yield 6.2 g. The melting point of these crystals was 203–204° C.

*Analysis.*—Calcd. for $C_{45}H_{54}N_2O_7S$ (eq. wt., 767.01): C, 70.47; H, 7.10; N, 3.65; S, 4.18. Found: C, 70.58; H, 7.41; N, 3.70; S, 4.39.

PART C–1.—7-O-TRITYL-3,4-O-ANISYLIDENE LINCOMYCIN-2-PHOSPHATE

A solution of 18.4 g. $POCl_3$ in 200 ml. dry pyridine was placed in a 1 liter three-necked flask fitted with a propeller stirrer, thermometer, dropping funnel and a $CaCl_2$ drying tube. The pyridine solution was cooled to –40° C. and a solution of 76.7 g. 7-O-trityl-3,4-O-anisylidene lincomycin in 200 ml. dry pyridine was added over a period of 10 minutes. The temperature within the reaction vessel was maintained at –38° to –42° C. by cooling with a Dry-Ice acetone bath. The pink solution was allowed to warm to –20° C. over a 25-minute period and then cooled to –45° C. and a solution of 36 ml. water in 150 ml. pyridine (pre-cooled to about –35° C.) was added in one portion. The solution immediately turned orange and the temperature rose to –30° C.

After four hours at room temperature, the solvent was removed under vacuum at 55° C. and 100 ml. ethanol was added and the solvent was removed again. Another 100 ml. portion of ethanol was added and the evaporation process was repeated to yield 7-O-trityl-3,4-O-anisylidene lincomycin-2-phospate as a viscous residue.

PART D–1.—LINCOMYCIN-2-PHOSPHATE (CRUDE)

The visious residue was dissolved in 400 ml. acetic acid with vigorous shaking and then diluted with 80 ml. of water. The solution was heated on a steam bath for one hour and the solvent was removed under high vacuum at 55° C. to a viscous residue which was stirred with 200 ml. water. The evaporation process was repeated yielding a yellow viscous residue. This residue was shaken with 700 ml. water, 100 ml. conc. ammonium hydroxide was added, and the suspension was extracted with 1 liter of chloroform. The aqueous layer was concentrated to a low volume to remove ammonia, diluted with water to a volume of 500 ml. and freeze-dried. The pale yellow crude lincomycin-2-phosphate amounted to 75 g.

The crude lincomycin-2-phosphate thus obtained was dissolved in 750 ml. water and applied to a 3 x 14" column of Dowex 1–X2 (acetate), polystyrene trimethylbenzylammonium acetate cation exchange resin crosslinked with 2% of divinylbenzene, at pH 9. The sample was applied at the rate of 750 ml./hour. Elution was conducted at the rate of 1500 ml./hour with an increasing linear ammonium acetate gradient at pH 9, comprised of 7 liter of water, pH 9 (0.1% concentrated ammonium hydroxide) and 7 liters of 2 N ammonium acetate, pH 9. The column effluent was monitored automatically with a Bendix recording polarimeter. Seven liters of forerun were discarded and the product peak was collected separately.

The colorless peak eluate was concentrated to a low volume (about 10–15% of original volume) to remove the majority of the ammonium acetate. The colorless solution was diluted to 4 liters with water and freeze-dried. The freeze-dried cake was heated to 100° C. under high vacuum to remove remaining traces of ammonium acetate.

PART E–1.—LINCOMYCIN-2-PHOSPHATE DIAMMONIUM SALT

The lyophylate of Part D–1 was dissolved in 200 ml. water and diluted with 200 ml. ethanol. The solution was cooled in an ice-water bath and then saturated with ammonia gas. The white precipitate of diammonium phosphate was removed by filtration and the filtrate was taken to dryness at 30° C. under high vacuum. The residue was dissolved in 200 ml. methanol and diluted with 1500 ml. ether to precipitate lincomycin-2-phosphate as the ammonium salt. The yield of white compound was 18.9 gm.

PART F–1.—LINCOMYCIN-2-PHOSPHATE HEMI-AMMONIUM SALT

The hemi-ammonium salt was obtained in the following fashion. A solution of 16.5 g. ammonium lincomycin-2-phosphate of Part E–1 was dissolved in 66 ml. water. The colorless solution was diluted with 3.6 ml. acetic acid and then diluted with 450 ml. acetone (the point of incipient turbidity). Crystallization occurred very rapidly. After cooling in the refrigerator for eight hours the crystals were isolated by filtration, washed with 20 ml. acetone-water (95–5) and then with 200 ml. acetone.

The white crystalline compound was dried at 100° for three hours under high vacuum and then equilibrated with the laboratory atmosphere overnight. The compound (the hemi-ammonium salt) is beautifully crystalline (needles) and is easily recrystallized.

*Analysis.*—Calcd. for $C_{36}H_{73}N_5O_{18}P_2S_2$ (990.10): C, 43.67; H, 7.43; N, 7.07; P, 6.26; eq. wt. 245.02. Found (corrected for 6.91% $H_2O$ and 0.87% inorganic phosphate as $NH_4H_2PO_4$): C, 42.22; H, 7.90; N, 7.07; P, 5.77; eq. wt., 237.

PART G–1.—LINCOMYCIN-2-PHOSPHATE

The hemi-ammonium salt of Part F–1 was heated at 118–120° C. for 8–24 hours under high vacuum to give lincomycin-2-phosphate.

By substituting 7-chloro- and 7-bromo-7-deoxy-lincomycins, both the R (Rectus) and S (Sinister) configurations, for lincomycin in Part A–1 and omitting Part B–1 there are obtained 7(R)-chloro-, 7(S)-chloro, 7(R)-bromo-, and 7(S) - bromo - 7 - deoxylincomycin-2-phosphates as the hemi-ammonium salts and as the zwitterion. The intermediate 3,4-O-arylidene lincomycin-2-phosphates and 3,4-O-arylidene epilincomycin-2-phosphate are also obtained. The following example is illustrative.

EXAMPLE 2

*7(S)-chloro-7-deoxylincomycin-2-phosphate*

PART A–2.—3,4-O-p-ACETAMIDOBENZYLIDENE-7(S)-CHLORO-7-DEOXYLINCOMYCIN

A solution of 10 g. 7(S)-chloro-7-deoxylincomycin·HCl in 20 ml. N,N-dimethylformamide and 170 ml. benzene was treated with 15 g. p-acetamidobenzaldehyde. The solution was refluxed for 1½ hours while collecting the water with a water trap. After cooling to room temperature a small amount of insoluble material was removed by filtration. The filtrate was diluted with 400 ml. of water and the resulting precipitate was isolated by filtration, washed with ether, and dried under a stream of nitrogen to give 7.4 g. of 3,4-O-p-acetamidobenzylidene-7(S)-chloro-7-deoxylincomycin·HCl.

The free base was prepared by stirring 7.4 g. of the hydrochloride salt with a mixture of 50 ml. of water and 10 ml. of concentrated ammonium hydroxide. The resulting solid material was isolated by filtration and dried under a stream of nitrogen to provide 5.0 g. of 3,4-O-p - acetamidobenzylidene-7(S)-chloro-7-deoxylincomycin free base, M.P. 109–114° C.

PART B–2.—7(S)-CHLORO-7-DEOXYLINCOMYCIN-2-PHOSPHATE 3,4-O-p-acetamidobenzylidene-7(S)-chloro - 7 - deoxylincomycin was phosphorylated with $POCl_3$ in pyridine as described in Example 1. After removal of the protective group with 80% acetic acid, the compound purified by elution ion exchange chromatography giving 7(S)-chloro-7-deoxylincomycin-2-phosphate.

By substituting the 7(S)-chloro-7-deoxylincomycin hydrochloride by 7(S)-bromo-7-deoxylincomycin hydrochloride, 7(S)-bromo-7-deoxylincomycin-2-phosphate is obtained.

The 7(S)-chloro and 7(S)-bromo-7-deoxylincomycins are prepared as follows:

(A) *7(S)-chloro-7-deoxylincomycin hydrochloride*

Lincomycin hydrochloride (10 g.—0.0226 mole), 200 ml. carbon tetrachloride, and 10 ml. $SOCl_2$ were stirred and heated at reflux for 4 hours. The reaction mixture was cooled to 25° C. and filtered. The yellow solid was dried under vacuum and then dissolved in about 10 ml. of boiling ethanol. Ethyl acetate was added to turbidity and the solution allowed to cool. The crystals of 7-chloro-7-deoxylincomycin hydrochloride thus formed were recovered in a yield of about 43%.

*Analysis.*—Calcd. for $C_{18}H_{33}ClN_2O_5S·HCl·H_2O$: C, 45.18; H, 7.37; Cl, 14.82; N, 5.86; S, 6.70; $H_2O$, 3.77. Found: C, 44.70; H, 7.65; Cl, 14.27; N, 5.78; S, 6.45; $H_2O$, 3.85.

(B) *7(S)-bromo-7-deoxylincomycin and its hydrobromide*

A solution of Rydon reagent was prepared by stirring a dry solution of 52.6 g. (0.2 M) of triphenylphosphine and 800 ml. of acetonitrile at 30° under nitrogen and 10 ml. (0.19 M) of bromine added over a 20-minute period. After stirring for 10 minutes more, 8.2 g. of lincomycin was added and the reaction stirred at 30° for 18 hr. A white solid was then present. The reaction was filtered and the solid discarded. Methanol (100 ml.) was added to the filtrate and the solvents then evaporated under vacuum. The viscous residue was dissolved in 100 ml. methanol, diluted with 1800 ml. of water and extracted six times with 200 ml. portions of ether. The ether extracts were discarded, the aqueous phase made basic (pH 11) with aqueous KOH and then extracted four times with 200 ml. portions of methylene chloride. The extracts were dried and evaporated, leaving 11 g. of a yellow solid which was chromatographed over 1 kg. of silica gel using methanol:chloroform 1:9 (v/v) as the solvent system. After a forerun of 1200 ml., 22 fractions of 56 ml. were collected. The last 6 (fractions 17–22) were pooled and evaporated to dryness yielding 2.8 g. of 7-bromo-7-deoxylincomycin. This was converted to the hydrobromide by dissolving in water, adding HBr to pH 1, filtering, and lyophilizing the filtrate. The hydrobromide had an $α_D$ +114° (c. 0.9314, $H_2O$) and the following analysis:

*Analysis.*—Calcd. for $C_{18}H_{34}Br_2N_2O_5S$: C, 39.28; H, 6.23; N, 5.09; S, 5.83; Br, 29.04. Found: C, 39.64; H, 6.19; N, 5.07; S, 6.04; Br, 28.59.

When the bromine is substituted by chlorine 7(S)-chloro-7-deoxylincomycin which is identical with the product obtained by chlorinating lincomycin with thionyl chloride is obtained. In place of triphenylphosphine there can be substituted triphenylphosphite. Also, in that case a methyl halide can be used in the place of halogen.

EXAMPLE 3

*Lincomycin-2-phosphate*

PART A–3.—7-O-TRITYL-3,4-O-ANISYLIDENE LINCOMYCIN-2-PHOSPHATE

In a 22 liter flask equipped with a calcium chloride drying tower, a low temperature thermometer, stirrer, and a 1 liter addition funnel there was placed 3,600 ml. of pyridine and 300 ml. of phosphoryl chloride. The resulting solution was cooled by means of a Dry Ice-acetone bath to −35° C. A solution of 1200 g. of 7-O-trityl-3,4-O-anisylidene lincomycin in 11 liters of pyridine was transferred under nitrogen to the addition funnel in 1 liter portions and introduced into the flask over a 25-minute period while keeping the reaction temperature at −25° C. to −30° C. Upon completion of the addition, the reaction mixture was stirred at −30° C. for one-half hour and then at −20° C. to −15° C. for another half hour. The reaction mixture was rapidly added to 12 liters of pyridine in a 10 gallon open top tank, the pyridine having been previously cooled by adding 3 kg. of ice and stirring for 5 minutes. The resulting solution was then concentrated in a flash evaporator at 55° C. to 7 liters. The flash evaporator was washed with 4 liters of ethanol which was combined in a 30 gal. open top tank with the concentrate. The concentrate was then diluted with good stirring with 10 gallons of water. 7-O-trityl-3,4-O anisylidene lincomycin-2-phosphate settled out as a yellow solid which was filtered off and washed with 5 gallons of water.

PART B-3.—LINCOMYCIN-2-PHOSPHATE

The filter cake of Part A-3 was dissolved in 15 liters of 80% acetic acid and heated at 85° C. for 45 minutes, after which 10 kg. of ice was added and the mixture transferred with stirring. After 10 minutes stirring the precipitate was filtered off and washed with 2 liters of water, and discarded. The combined filtrate and wash was evaporated to 4 liters, diluted with 5 gallons of water, and again concentrated to 2 liters. This solution plus 2 gallons of water used to wash the flask in which the evaporation was conducted was extracted with 1 gallon of chloroform. The chloroform phase was back-extracted with 2 liters of water which was added to the aqueous phase. The combined aqueous phase was then concentrated to 3 liters in a flash evaporator. The aqueous concentrate was set aside and 4 liters of 50% aqueous ethanol (by volume) was added to the evaporator and there concentrated to 2 liters which were then combined with the aqueous concentrate. The combined concentrates were then further concentrated under vacuum to 2 liters. One gallon of absolute ethanol was then added and the solution concentrated to 3 liters. One gallon of absolute ethanol was added, the solution was seeded with crystals of the zwitterion form of lincomycin-2-phosphate and allowed to stand for 2 hours, during which white crystals of the zwitterion form of lincomycin-2-phosphate separated. These crystals were filtered off, washed with 1 gallon of absolute ethanol, dried under vacuum at 40° C. for 24 hours. There was obtained 310 g. (32.4% yield) of lincomycin-2-phosphate as white crystals, first crop, M.P. 215–216° C., second crop, M.P. 214–215° C. The first and second crops were combined and recrystallized from aqueous ethanol to give 220 grams of white first crop crystals, M.P. 216–218° C. (from 71.5% aqueous ethanol by volume) and 95 grams of second crop white crystals, M.P. 216–217° C. (from 80% ethanol by volume). The first and second crops were combined and recrystallized from aqueous ethanol to yield 250 g. of lincomycin-2-phosphate as white crystals, M.P. 222–224° C.

*Analysis.*—Calcd. for $C_{18}H_{35}O_9N_2SP$: C, 44.43; H, 7.25; N, 5.76; P, 6.37. Found: C, 44.72; H, 7.35; N, 5.84; P, 6.60. (Corrected for 4% water.)

The zwitterion form can, if desired, be converted to the other forms by addition of the acids or bases listed above.

By substituting the 7-trityl-3,4-O-anisylidene lincomycin of Part A-3 by 3,4-O-anisylidene 7(S)-chloro-, 7(R)-chloro-, 7(S)-bromo-, and 7(R)-bromo-7-deoxylincomycins, there are obtained 3,4-O-anisylidene 7(S)-chloro-, 7(R)-chloro-, 7(S)-bromo-, and 7(R)-bromo-7-deoxylincomycin-2-phosphates and on treatment of these products by the procedure of Part B-3 there are obtained 7(S)-chloro-, 7(R)-chloro-, 7(S)-bromo-, and 7(R)-bromo-7-deoxylincomycin-2-phosphates as the zwitterion.

EXAMPLE 4

*Lincomycin C-2-phosphate [ethyl-6,8-dideoxy-6-(trans-1-methyl - 4 - propyl - L - 2 - pyrrolidinecarboxamide) - 1 - thio - D - erythro - α - D - galacto - octopyranoside - 2-phosphate]*

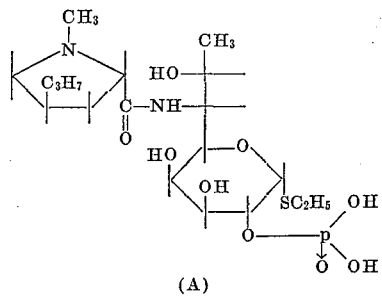

(A)

By substituting the lincomycin hydrochloride of Example 1 by lincomycin C hydrochloride, there is obtained lincomycin C-2-phosphate.

(B) PREPARATION OF LINCOMYCIN C

Lincomycin C is obtained by reacting lincomycin with ethanethiol (ethyl mercaptan) to form a diethyl dithioacetal and heating the reaction mixture in the presence of p-toluenesulfonic acid or heating to fusion. The following procedure is illustrative.

(B1) 6,8-*dideoxy - 6 - (trans-1-methyl-4-propyl-L-2-pyrrolidine-carboxamido)-D-erythro - D - galacto-aldehydo-octose diethyl dithioacetal*

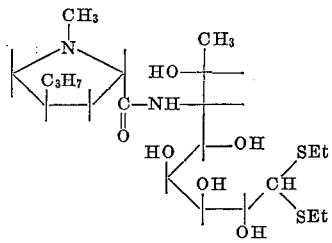

(XXI)

In a 1-liter, 3-necked flask were placed concentrated hydrochloric acid (150 cc.) and ethanethiol (50 cc., previously cooled to 0°), followed by lincomycin hydrochloride (15.0 gm.). After stirring magnetically at room temperature for 5 hours, the reaction mixture was diluted with an equal volume of ice-water, and the solution extracted thoroughly with Skellysolve B (technical hexane), these extracts being discarded.

The majority of the acid was neutralized by the careful addition of solid potassium hydroxide (100 gm.), keeping the temperature of the well-stirred reaction mixture between 20 and 30° C. by cooling in acetone-Dry Ice. Solid potassium chloride was removed by filtration, and the solid washed well with chloroform. Additional chloroform was added to the filtrate (ca. 150 cc.) and the mixture, stirred magnetically, was adjusted to pH 10 by the addition of aqueous sodium hydroxide (2 N). The chloroform layer was separated, the aqueous layer extracted thoroughly with chloroform, the combined extracts washed twice with water and dried over anhydrous sodium sulfate. Removal of the solvent at 30° C. in vacuo gave a semi-solid residue, which on being crystallized from acetone, gave 5.41 gm. of 6,8-dideoxy-6-(trans-1-methyl-4-propyl - L - 2 - pyrrolidinecarboxamido) - D - erythro - D-galacto-aldehydo-octose diethyl dithioacetal as colorless flattened needles, M.P. 130–132°. Concentration of the mother-liquors gave additional material (1.50 gm.), M.P. 129–131°. (Total yield, 6.91 gm., 42.4%.)

*Analysis.*—Calcd. for $C_{21}H_{42}N_2O_6S_2$: C, 52.25; H, 8.77; N, 5.81; S, 13.29%. Found: C, 52.38; H, 8.71; N, 5.93; S, 13.46%.

(B2) Cyclization to lincomycin C (a) One part each of the diethyl dithioacetal of Part B1 and p-toluenesulfonic acid monohydrate were refluxed in 25 parts of acetonitrile until substantial antibacterial activity was obtained. The reaction mixture was cooled and evaporated to dryness and chromatographed on silica gel using a solvent mixture ethyl acetate, acetone and water in the ratio of 8:5:1, respectively. Fractions 102 through 131 showed antibacterial activity. Of these fractions, 105 through 125 were pooled, evaporated to dryness, and crystallized from acetone acidified with hydrochloric acid and recrystallized by dissolving in water and adding acetone to give crystals of lincomycin C hydrochloride, M.P. 149–153°.

(b) The diethyl dithioacetal of Part B1 was heated to 260° for about 3 minutes and the odor of ethyl mercaptan was noted. The product on being chromatographed as in Part B2(a) yielded lincomycin C.

(C) PREPARATION OF LINCOMYCIN C BY FERMENTATION

The lincomycin C hydrochloride was prepared as follows:

FERMENTATION

A soil slant of *Streptomyces lincolnensis* var. *lincolnensis*, NRRL 2936, was used to inoculate a series of 500-ml. Erlenmeyer flasks each containing 100 ml. of seed medium consisting of the following ingredients.

|  | G. |
|---|---|
| Yeastolac [1] | 10 |
| Glucose monohydrate | 10 |
| N-Z-Amine B [2] | 5 |
| Tap water, q.s., 1 liter. | |

[1] Yeastolac is a protein hydrolysate of yeast cells.
[2] N-Z-Amine B is Sheffield's enzymatic casein digest.

The seed medium presterilization pH was 7.3. The seed was grown for 2 days at 28° C. on a Gump rotary shaker operating at 250 r.p.m.

A 5% inoculum of the seed described above (5 ml.) was added to each of 30 500-ml. Erlenmeyer flasks each containing 100 ml. of the following fermentation medium:

| | | |
|---|---|---|
| Glucose monohydrate | g— | 15 |
| Starch | g— | 40 |
| Molasses | g— | 20 |
| Wilson's Peptone Liquor No. 159 [1] | g— | 10 |
| Corn steep liquor | g— | 20 |
| Calcium carbonate | g— | 8 |
| Lard oil | ml— | 0.5 |
| Tap water, q.s., 1 liter. | | |

[1] Wilson's Peptone Liquor No. 159 is a preparation of enzymatically hydrolyzed proteins from animal origin.

At the time of inoculation, DL-ethionine was added to a final concentration of 2 mg./ml.

The shake flasks were harvested after 4 days of fermentation at 28° C. on a Gump rotary shaker at 250 r.p.m. They assayed 200 mcg./ml. on the *S. lutea* assay, hereinafter described. The whole beer solids was about 20 gm./liter.

PURIFICATION

Whole beer (235 liters) from a DL-ethionine fermentation was filtered at harvest pH using a filter aid as required. The mycelial cake was washed with water and the cake was then discarded. The filtered beer and water wash (275 liters) was stirred for 45 minutes with 12.5 kg. of activated carbon and 2.5 kg. of diatomaceous earth. The mixture was filtered and the filtrate was discarded. The carbon cake was washed with 60 liters of water and the water was discarded. The cake was washed with 70 liters of 20% aqueous acetone and the 20% aqueous acetone wash was discarded. The cake was then eluted twice with 100 liter portions of 90% aqueous acetone. The eluates were combined (215 liters) and the solution was concentrated (18 liters). This concentrate was adjusted to pH 10.0 with a 50% aqueous sodium hydroxide solution and extracted three times with 20 liter portions of methylene chloride. The methylene chloride extracts were combined (60 liters) and then concentrated to give an oily preparation (7.14 g.) containing lincomycin and lincomycin C in equal amounts and both in the free base form. This preparation was then dissolved in 200 ml. of methylene chloride. The solution was clarified by filtration and then concentrated to dryness in vacuo. The residue was dissolved in 100 ml. of 1 N methanolic hydrogen chloride. The methanolic solution was then mixed with 3.2 liters of ether under stirring. The resulting precipitated colorless, crude lincomycin hydrochloride and lincomycin C hydrochloride was isolated by filtration and dried; yield, 7.14 g. assaying 940 mcg./mg. against *Sarcina lutea*. (The assay against *Sarcina lutea* is conducted on agar buffered to pH 6.8 with pH 7.0 phosphate buffer [0.1 M]. A unit volume [0.08 ml.] of solution containing the material to be assayed is placed on a 12.7 ml. assay disc which is then placed on an agar plate seeded with the assay microorganism.) Thin layer chromatography showed the presence of both lincomycin hydrochloride and lincomycin C hydrochloride in approximately equal amounts.

Crude lincomycin C hydrochloride (7.0 g.) was dissolved in 20 ml. of water and 20 ml. of butanol, pH adjusted to 4.2 with 1 N HCl, and the solution distributed in a counter current distribution apparatus for 1000 transfers. Analysis by thin-layer chromatography showed that the fractions in tubes 135 to 190 contained lincomycin C. These fractions were combined, and the solution was concentrated to an aqueous and freeze dried to give 2.44 g. of lincomycin C hydrochloride assaying 1.4 times lincomycin hydrochloride. Five hundred mg. of this preparation was dissolved in 2 ml. of water, 1 ml. of methanol, and 100 ml. of acetone. The solution was clarified by filtration. The filtrate was mixed with ether until crystals appeared. The mixture was allowed to stand at room temperature for 1 hr. Crystalline (cubes) lincomycin C hydrochloride was separated from the supernatant material solution by decantation. These crystals were recrystallized from one ml. of water, one ml. of methanol, 80 ml. of acetone and 20 ml. of ether; yield, 250 mg. of crystalline (cubes) lincomycin C hydrochloride. The supernatant (obtained as described above) was allowed to stand at 5° C. for 4 hours. Crystalline (needles) lincomycin C hydrochloride which precipitated was filtered and dried; yield, 150 mg. of crystalline (needles) lincomycin C hydrochloride, M.P. 151–157° C.

(D) ALTERNATIVE METHOD FOR PREPARATION OF LINCOMYCIN C

Lincomycin hydrochloride (8.85 f.—0.02 mole) was dissolved in 20 ml. of water, cooled at 0° and stirred while adding bromine (3.52 g.—0.022 mole) dropwise over a 1 minute period. Ethanethiol (25 ml.) was added and the mixture stirred at 25° for 2 hours. The clear, colorless, 2-phase system (ethanethiol is relatively insoluble in water) was cooled in an ice bath and hydrogen chloride gas bubbled in for about 5 minutes. The lower, aqueous phase turned red. The reaction mixture was then extracted 3 times with 100 ml. portions of Skellysolve B and aqueous sodium hydroxide solution added to bring the aqueous phase to pH 11. The basic phase was extracted well with chloroform. The chloroform extracts were washed with saturated sodium chloride solution, dried, and evaporated under vacuum to yield 6.2 g. of a white solid. 4.8 g. of this solid was chromatographed over 800 g. of silica gel using methanol-chloroform (1:7, respectively) as the solvent system. After 800 ml. of forerun, 80 fractions of 25 ml. each were collected. Fractions 40–58 were combined and evaporated to dryness and the residual solid recrystallized from acetone to yield 0.5 g. of material identical with the diethyl dithioacetal of Part B1. Fractions 65–75 were combined, evaporated to dryness, and dissolved in a mixture of 5 ml. methanol and 400 ml. diethyl ether. Hydrogen chloride gas added and the white solid which precipitated was collected. On being recrystallized from aqueous acetone, 0.5 g. of lincomycin C hydrochloride, identical with that of Part C, was obtained.

(E) OTHER ALKYL 6,8-DIDEOXY-6-(TRANS-1-METHYL-4 - PROPYL-L-2-PYRROLIDINECARBOXAMIDO)-1-THIO-D-ERYTHRO - α - D - GALACTO-OCTOPYRANOSIDES-2-PHOSPHATES

By substituting the ethanethiol in Part B1 and Part D of this example by other alkyl mercaptans, for example, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl mercaptans and the isomeric forms thereof; by cycloalkyl mercaptans, for example, cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl and 3-cyclopentylpropyl mercaptans; or by aralkyl mercaptans, for example, benzyl, phenethyl, 3-phenylpropyl, and 1-naphthylmethyl mercaptans, the corresponding alkyl, cycloalkyl, and aralkyl 6,8-dideoxy-6-(trans-1-methyl-4-propyl - L-2-pyrrolidinecarboxamido)-1-thio-D-erythro-α-D-galacto-octopyranosides are obtained, which on treatment by the procedure of Example 1 are converted to the corresponding alkyl, cycloalkyl, and aralkyl 6,8-dideoxy-6 - (trans - 1 - methyl - 4 - propyl - L - 2 - pyrrolidinecarboxamido) - 1 - thio - D - erythro - α - D - galacto-octanopyranoside-2-phosphates. The compounds thus obtained wherein alkyl is propyl, butyl, pentyl, and hexyl (obtained respectively when propyl, butyl, pentyl, and hexyl mercaptans are used) are especially effective antibacterials, having the same in vivo spectrum as lincomycin and equal or greater activity.

EXAMPLE 5

Methyl-6,8-dideoxy - 6 - (trans-1-alkyl-4-butyl-L-2-pyrrolidinecarboxamido) - 1 - thio - D - erythro-α-D-galacto-octopyranoside-2-phosphates

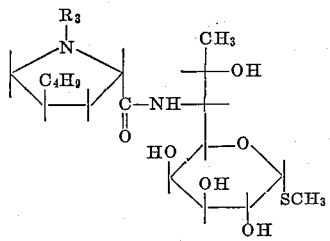

$R_3$=methyl or ethyl.

PART A

By substituting the lincomycin hydrochloride of Example 1 by methyl 6,8-dideoxy-6-(trans-1-ethyl-4-butyl-L - 2 - pyrrolidinecarboxamido) - 1 - thio - D - erythro-α-D-galacto-octopyranoside hydrochloride, there is obtained methyl 6,8 - dideoxy - 6-(trans-1-ethyl-4-butyl-L-2-pyrrolidinecarboxamido) - 1 - thio - D - erythro - α - D-galacto-octopyranoside-2-phosphate.

On substituting the cis epimer, there is obtained methyl 6,8 - dideoxy - 6 - (cis - 1 - ethyl - 4 - butyl - L-2-pyrrolidinecarboxamido) - 1 - thio - D - erythro - α - D - galacto-octopyranoside-2-phosphate having the same antibacterial spectrum.

On substituting the 1-methyl analogs, methyl 6,8-dideoxy - 6 - (cis- and trans-1-methyl-4-butyl-L-2-pyrrolidinecarboxamido) - 1 - thio - D - erythro - α - D - galacto-octopyranoside-2-phosphates are obtained.

The cis and trans epimers used as starting materials in the above example were prepared as follows:

(B) 4-BUTYLIDENE-1-CARBOBENZOXY-L-PROLINE AND THE DICYCLOHEXYL AMINE SALT THEREOF

Sodium hydride (19 g.) as a 53% suspension in mineral oil was warmed with 350 ml. of dimethyl sulfoxide at a temperature of 70–75° C. until the reaction was complete (about 30 minutes). After cooling to 32° C., 16.2 g. of butyl triphenylphosphonium bromide was added, and the resulting reaction mixture was stirred for 1 hour to insure complete reaction. A solution of 26 g. of 4-keto-1-carbobenzoxy-L-proline in 100 ml. of dimethyl sulfoxide was added, and the resulting mixture was heated at 70° C. for 3 hours. The reaction mixture was cooled to 25° C. and 1 liter of 2.5% aqueous potassium bicarbonate added. This mixture was washed twice with 700 ml. portions of ether and the ether was discarded after back extracting with 150 ml. of 2.5% aqueous potassium bicarbonate. The bicarbonate solutions were combined and acidified with 4 N hydrochloric acid. The acidified mixture was extracted with four 500-ml. portions of ether. The combined ether extracts were washed successively with 250 ml. of water, three 250-ml. portions of saturated aqueous sodium bisulfite, and 250 ml. of water, and dried over anhydrous sodium sulfate. Evaporation of the solvent under vacuum gave 24 g. of an oily residue which was 4-butylidene-1-carbobenzoxy-L-proline.

This residue was dissolved in 31 ml. of acetonitrile and treated with 18 ml. of dicyclohexylamine and refrigerated. The crystals were collected, washed with acetonitrile and dried in vacuo giving 21 g. (46.8%) of the crystalline dicyclohexylamine salt melting at 136–140° C. After two recrystallizations from acetonitrile, an analytical sample was obtained which melted at 142–144° C. and had a rotation of $[\alpha]_D$ −4° (c.=0.99, CHCl$_3$).

Analysis.—Calcd. for $C_{29}H_{44}N_2O_4$: C, 71.86; H, 9.15; N, 5.78. Found: C, 71.69; H, 9.30; N, 5.74.

Ten grams of the dicyclohexylamine salt of 4-butylidene1-carbobenzoxy-L-proline was shaken with ether and excess 5% aqueous potassium hydroxide until no solid remained. The layers were separated and each one was backwashed. The aqueous alkaline layer was combined with the backwash from the ether layer and acidified with 4 N hydrochloric acid. The mixture was repeatedly extracted with ether and the ether extracts were combined, dried over sodium sulfate, and evaporated in vacuo to give 6.3 g. (93%) of 4-butylidene-1-carbobenzoxy-L-proline as an oil.

(C) 4-BUTYL-1-CARBOBENZOXY-L-PROLINE

The oil from Part B was hydrogenated in 200 ml. of methanol over 2.1 g. of 10% platinum on Dowex-1 catalyst under 40 lbs. hydrogen pressure. The catalyst was removed by filtration and the filtrate evaporated to yield 6.3 g. of 4-butyl-1-carbobenzoxy-L-proline as an oil. The product contained about 2 parts cis-4-butyl-1-carbobenzoxy-L-proline to each part of trans-4-butyl-1-carbobenzoxy-L-proline.

If desired, the hydrogenation of the 4-ylidene group can be postponed to any later step, even to the final step, in the process.

By substituting the butyltriphenylphosphonium bromide of Part B by other substituted triphenylphosphonium bromides where the substituent is methyl, ethyl, propyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl and the isomeric forms thereof; cyclopropyl, cyclobutyl, cyclopentyl, cyclohexyl, cycloheptyl cyclooctyl 2-cyclopropylethyl and 3-cyclopentylpropyl; benzyl, phenethyl 3-phenylpropyl, and 1-naphthylmethyl, the corresponding 4-alkylidene-, 4-cycloalkylidene-, and 4-aralkylidene-1-carbobenzoxy-L-prolines and the corresponding 4-alkyl-, 4-cycloalkyl-, and 4-aralkyl-1-carbobenzoxy-L-prolines are obtained. For example, when the butyltriphenylphosphonium bromide is substituted by ethyl-, propyl-, isobutyl-, pentyl-, and hexyltriphenylphosphonium bromides there are obtained 4-ethylidene-1-carbobenzoxy-L-proline, 4 - propylidene-1-carbobenzoxy-L-proline, 4-isobutylidene-1-carbobenzoxy-L-proline, 4-pentylidene-1-carbobenzoxy-L-proline, and 4-hexylidene-1-carbobenzoxy-L-proline, and cis and trans 4-ethyl-1-carbobenzoxy-L-proline, 4-propyl-1 - carbobenzoxy-L-proline, 4-isobutyl-1 - carbobenzoxy - L - proline, 4-pentyl-1-carbobenzoxy-L-proline, and 4-hexyl-1-carbobenzoxy-L-proline.

(D) METHYL 6-AMINO-6,8-DIDEOXY-1-THIO-D-ERYTHRO-α-D-GALACTO-OCTOPYRANOSIDE (α-MTL)

A solution of 40 g. of lincomycin free base (U.S. Patent 3,086,912) in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled acetonitrile was added, and the mixture was stirred until the crystals were suspended. The crystals were collected on a filter, washed with acetonitrile and with ether. The yield of white, crystalline α-MTL free base after drying in vacuo at room temperature was 21 g. (84%). Recrystallization was accomplished by dissolving α-MTL free base in hot dimethylformamide and adding an equal volume of ethylene glycol dimethyl ether.

Methyl 6 - amino - 6,8 - dideoxy - 1-thio-D-erythro-α-D-galactooctopyranoside free base has a melting point of 225–228° C., an optical rotation of $[\alpha]_D^{25}$ +276° (c.=.768, water) and a pKa of 7.45.

Analysis.—Calc'd. for $C_9H_{19}NO_5S$: C, 42.7; H, 7.56; N, 5.53; S, 12.66. Found: C, 42.6; H, 7.49; N, 5.75; S, 12.38.

By substituting lincomycin by other alkyl or by cycloalkyl or aralkyl 6,8-dideoxy-6-(trans-1-methyl-4-propyl-L - 2 - pyrrolidinecarboxamido) - 1 - thio-D-erythro-α-D-galacto-octopyranosides where alkyl is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cycloalkyl is cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl and 3-cyclopentylpropyl; and aralkyl is benzyl, phenethyl, 3-phenylpropyl, and 1-naphthylmethyl, the corresponding alkyl, cycloalkyl, and aralkyl 6-amino-6,8-dideoxy-1-thio-D-erythro-α-D-galacto-octopyranosides are obtained. For example, by substituting the lincomycin by ethyl-, propyl-, butyl-, pentyl-, and hexyl 6,8-dideoxy-6-(trans-1-methyl-4-propyl-L-2 - pyrrolidinecarboxamido)-1-thio-D-erythro-α-D-galacto-octopyranosides, ethyl 6-amino-6,8-dideoxy-1-thio-D-erythro - α - D-galacto-octopyranoside, propyl 6-amino-6,8-dideoxy-1-thio-D-erythro-α-D-galacto - octopyranoside, butyl 6-amino-6,8-dideoxy-1-thio-D-erythro-α-D-galacto-octopyranoside, pentyl 6-amino - 6,8 - dideoxy-1-thio-D-erythro-α-D-galactooctopyranoside, and hexyl 6-amino-6,8-dideoxy-1-thio-D-erythro-α-D-galacto - octopyranoside are obtained.

(E) METHYL 6,8-DIDEOXY - 6 - (1 - CARBOBENZOXY-4-BUTYL-L-2-PYRROLIDINECARBOXAMIDO - 1 - THIO-D-ERYTHRO - α - D - GALACTO-OCTOPYRANOSIDE FREE BASE

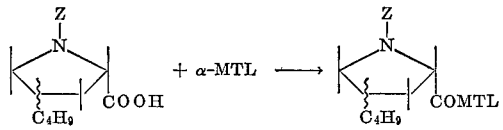

To a solution of 6.3 g. of 4-butyl-1-carbobenzoxy-L-proline (the oil from Part C) in 175 ml. of distilled acetonitrile cooled to 0° there was added 3.46 ml. of triethylamine followed by 3.34 ml. of isobutyl chloroformate. The mixture was stirred at 0° C. (±3°) for 15 min. A solution of 6.2 g. of α-MTL free base from Part D in 85 ml. of water was added, and the reaction mixture was stirred at 0° C. for 0.5 hr. and at 25° C. for 1 hr. The reaction product was then filtered and dried yielding 4.57 g. (37.7%) of methyl 6,8-dideoxy-6-(1-carbobenzoxy - 4-butyl - L - 2 - pyrrolidinecarboxamido)-1-thio-D-erythro-α-D-galacto-octopyranoside free base. The mother liquor was concentrated under vacuum and an additional 4.25 g. (35.2%) of product recovered. Recrystallization from acetonitrile produced crystals of methyl 6,8-dideoxy-6-(1-carbobenzoxy-4-butyl-L-2-pyrrolidinecarboxamido)-1-thio-D-erythro-α-D-galacto-octopyranoside free base melting at 194–196° C. A second recrystallization from acetonitrile afforded an analytical sample, M.P. 195.5–200° C., $[\alpha]_D$ +111° (c., 0.98, MeOH).

Analysis.—Calc'd. for $C_{26}H_{40}N_2O_8S$: C, 57.75; H, 7.46; N, 5.13; S, 5.93. Found: C, 57.58; H, 7.16; N, 5.50; S, 6.07.

(F) METHYL 6,8-DIDEOXY - 6 - (4-BUTYL-L-2-PYRROLIDINECARBOXAMIDO) - 1 - THIO-D-ERYTHRO-α-D-GALACTO-OCTOPYRANOSIDE HYDROCHLORIDE

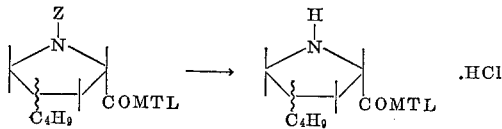

A solution of 7.8 g. of methyl 6,8-dideoxy-6-(1-carbobenzoxy-4-butyl-L-2-pyrrolidinecarboxamido) - 1-thio-D-erythro-α-D-galacto-octopyranoside free base from Part E in 200 ml. of methanol was shaken over 2 g. of 10% palladium on carbon under 40 lbs. of hydrogen pressure for 17 hours. The catalyst was removed by filtration and the solution concentrated under vacuum. The residue was dissolved in a mixture of 20 ml. of acetone and 20 ml. of water and acidified with 6 N hydrochloric acid. Dilution with 4 volumes of acetone precipitated methyl 6,8-dideoxy-6-(4-butyl-L-2-pyrrolidinecarboxamido) - 1-thio-D-erythro - α - D - galacto-octopyranoside hydrochloride which was collected by filtration and dried. The crystals, dried at 55° C. under vacuum, weighed 4.7 g. and melted at 188–194° C. The analytical sample obtained by recrystallization from acetone melted at 197–199° C. and gave $[\alpha]_D^{25}$ +150° (water, C., 0.89).

Analysis.—Calcd. for $C_{18}H_{34}N_2O_6S \cdot HCl$: C, 48.80; H, 7.96; N, 6.32; S, 7.24. Found (corrected for 5.54% water): C, 48.58; H, 8.19; N, 6.04; S, 7.36.

This material possesses 8% of the antibacterial activity of lincomycin by S. lutea assay.

By substituting the α-MTL by other alkyl or by cycloalkyl or aralkyl 6-amino-6,8-dideoxy-1-thio-D-erythro-α-D - galacto - octanopyranosides wherein alkyl is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cycloalkyl is cyclopropyl, cyclobutyl, cyclopentyl, cyclohexyl, cycloheptyl, cyclooctyl, 2 - methylcyclopentyl, 2,3 - dimethylcyclobutyl, 2-methylcyclobutyl, and 3-cyclopentylpropyl; and aralkyl is benzyl, phenethyl, 3-phenylpropyl, and 1-naphthylmethyl, the corresponding alkyl, cycloalkyl, and aralkyl 6,8-dideoxy-6-(1-carbobenzoxy- 4-butyl-L-2-pyrrolidinecarboxamido)-1-thio-D-erythro-α-D-galactooctopyranosides and the corresponding alkyl, cycloalkyl, and aralkyl 6,8-dideoxy-6-(4-butyl-L-2-pyrrolidinecarboxamido) - 1-thio-D-erythro-α-galacto-octopyranosides and the 2-phosphates thereof are obtained. For example, by substituting the α-MTL by ethyl, propyl, butyl, pentyl, and hexyl 6-amino-6,8-dideoxy-1-thio-D-erythro-α-D - galactooctopyranoside, there are obtained ethyl 6,8-dideoxy-6-(1-carbobenzoxy-4-butyl-L-2-pyrrolidinecarboxamido) - 1 - thio-D-erythro-α - D - galactooctopyranoside, propyl 6,8 - dideoxy-6-(1-carbobenzoxy - 4 - butyl-L-2-pyrrolidinecarboxamido)-1-thio-D-erythro - α - D - galacto-octopyranoside, butyl 6,8-dideoxy-6-(1-carbobenzoxy - 4 - butyl-L-2-pyrrolidinecarboxamido)-1-thio-D-erythro-α-D - galactooctopyranoside, pentyl 6,8 - dideoxy - 6 - (1 - carbobenzoxy-4-butyl-L-2-pyrrolidinecarboxamido) - 1-thio-D-erythro-α-D-galactooctopyranoside, hexyl 6,8-dideoxy-6-(1-carbobenzoxy-4-butyl-L-2-pyrrolidinecarboxamido) - 1 - thio-D-erythro-α-D-galacto-octopyranoside, ethyl 6,8-dideoxy-6-(4-butyl-L-2 - pyrrolidinecarboxamido) - 1 - thio - D-erythro-α-D-galacto-octopyranoside, propyl 6,8-dideoxy-6-(4-butyl-L-2 - pyrrolidinecarboxamido) - 1 - thio - D-erythro-α-D-galacto-octopyranoside, butyl 6,8-dideoxy-6-(4-butyl-L-2-pyrrolidinecarboxamido) - 1-thio-D-erythro-α-D-galacto-octopyranoside, pentyl 6,8 - dideoxy - 6 - (4-butyl-L-2- pyrrolidinecarboxamido) - 1 - thio-D-erythro-α-D-galacto-octopyranoside, hexyl 6,8-dideoxy-6-(4-butyl-L-2-pyrrolidinecarboxamido) - 1 - thio - D-erythro - α - D - galacto-octopyranoside and the 2-phosphates thereof.

By substituting the 4-butyl-1-carbobenzoxy-L-proline by other 4-alkyl-1-carbobenzoxy-L-prolines where the 4-alkyl is ethyl, propyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; by 4-cycloalkyl-1-carbobenzoxy-L-prolines where 4-cycloalkyl is cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl, and 3-cyclopentylpropyl; and by 4-aralkyl-1-carbobenzoxy-L-prolines where 4-aralkyl is benzyl, phenethyl, 3-phenylpropyl, and 1-naphthylmethyl, the corresponding alkyl, cycloalkyl, and aralkyl 6,8-dideoxy-6-(1-carbobenzoxy-4-alkyl, 4-cycloalkyl, and 4-aralkyl-L-2-pyrrolidinecarboxamido) - 1 - thio-D-erythro-α-D-galacto-octopyranosides, and the corresponding alkyl, cycloalkyl, and aralkyl-6-(4-alkyl, 4-cycloalkyl, 4-aralkyl-L-2-pyrrolidinecarboxamido) -1 - thio - D - erythro-α-D-galacto-octopyranosides and the 2-phosphates thereof are obtained. For example, by substituting the 4-butyl-1-carbobenzoxy-L-proline by 4-methyl-, 4-ethyl-, 4-propyl-, 4-pentyl-, and 4-hexyl-1-carbobenzoxy-L-prolines, there are obtained methyl, ethyl, propyl, butyl, pentyl, and hexyl 6,8 - dideoxy-6-(1-carbobenzoxy-4-methyl-L-2-pyrrolidinecarboxamido) - 1 - thio - D-erythro-α-D-galacto-octopyranosides; methyl, ethyl, propyl, butyl, pentyl, and hexyl 6,8-dideoxy-6-(1-carbobenzoxy-4-ethyl-L-2-pyrrolidinecarboxamido) - 1 - thio - D - erythro - α - D-galacto-octopyranosides; methyl, ethyl, propyl, butyl, pentyl, and hexyl 6,8-dideoxy - 6 - (1-carbobenzoxy-4-propyl-L-2-pyrrolidinecarboxamido - 1 - thio - D - erythro-α-D-galacto-octopyranosides; methyl, ethyl, propyl, butyl, pentyl, and hexyl 6,8 - dideoxy - 6 - (1 - carbobenzoxy-4-pentyl-L-2-pyrrolidinecarboxamido) - 1 - thio-D-erythro-α-D-galacto-octopyranosides; methyl, ethyl, propyl, butyl, pentyl, and hexyl 6,8 - dideoxy - 6 - (1 - carbobenzoxy-4-hexyl-L-2-pyrrolidinecarboxamido) - 1 - thio-D-erythro-α-D-galacto-octopyranosides; methyl, ethyl, propyl, butyl, pentyl, and hexyl 6,8 - dideoxy - 6 - (4 - methyl-L - 2 - pyrrolidinecarboxamido) - 1-thio-D-erythro-α-D-galacto-octopyranosides and the 2-phosphates thereof; methyl, ethyl, propyl, butyl, pentyl, and hexyl 6,8-dideoxy-6-(4-ethyl-L-2-pyrrolidinecarboxamido) - 1 - thio - D-erythro-α-D-galacto-octopyranosides and the 2-phosphates thereof; methyl, ethyl, propyl, butyl, pentyl, and hexyl 6,8-dideoxy-6-(4-propyl-L-2-pyrrolidinecarboxamido) - 1 - thio-D-erythro-α-D-galacto-octopyranosides and the 2-phosphates thereof; methyl, ethyl, propyl, butyl, pentyl, and hexyl 6,8-dideoxy-6-(4-pentyl - L - 2 - pyrrolidinecarboxamido)-1-thio-D-erythro-α-D-galacto-octopyranosides and the 2-phosphates thereof; and methyl, ethyl, propyl, butyl, pentyl, and hexyl 6,8-dideoxy-6-(4-hexyl-L-2-pyrrolidinecarboxamido)-1-thio - D-erythro-α-D-galacto-octopyranosides and the 2-phosphates thereof.

(G1) METHYL 6,8 - DIDEOXY-6-(1-METHYL-4-BUTYL-L-2-PYRROLIDINECARBOXAMIDO) - 1 - THIO-D-ERYTHRO-α-D-GALACTO-OCTOPYRANOSIDE HYDROCHLORIDE

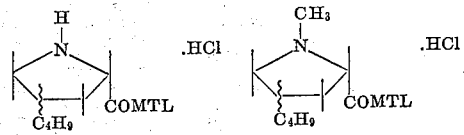

A solution of 2.0 g. of methyl 6,8-dideoxy-6-(4-butyl-L-2-pyrrolidinecarboxamido) - 1 - thio - D - erythro-α-D-galacto-octopyranoside hydrochloride from Part F and 2.0 ml. of 37% Formalin in 150 ml. of methanol was shaken over 500 mg. of 10% palladium on carbon under 40 lbs. of hydrogen pressure for 3.5 hrs. Removal of the catalyst by filtration and the solvent by distillation in vacuo yielded partially crystalline methyl 6,8-dideoxy-6-(1 - methyl - 4 - butyl - L - 2 - pyrrolidinecarboxamido)-1 - thio - D - erythro - α - D - galacto - octopyranoside hydrochloride which by TLC (thin layer chromatography) on silica gel using a mixture of ethyl acetate, acetone, water (8:4:1) for elution and KMnO₄ solution for detection consisted chiefly of two materials, the cis and trans epimers of methyl 6,8 - dideoxy - 6 - (1 - mehyl-4-butyl - L - 2 - pyrrolidinecarboxamido) - 1 - thio - D-erythro - α - D - galacto - octopyranoside hydrochloride in a ratio of about 3 to 2.

(G2) SEPARATION OF THE CIS AND TRANS FORMS BY CHROMATOGRAPHY

The methyl 6,8 - dideoxy - 6 - (1 - methyl - 4 - butyl-L - 2 - pyrrolidinecarboxamido) - 1 - thio D - erythro-α - D - galacto - octopyranoside hydrochloride from Part G1 were dissolved in a mixture of methanol and methylene chloride (1:1) and 1.5 ml. of triethylamine added. To this solution was added 7 g. of silica gel and the solvent evaporated under vacuum leaving the antibiotic deposited on the silica gel which was sifted on top of a chromatographic column of 200 grams of silica gel packed with a solvent mixture consisting of ethyl acetate, acetone, water in a ratio of 8:4:1. The column was developed by eluting with the same solvent and 20 ml. portions were collected. Thin layer chromatography of each fraction showed that fractions 31–38, 310 mg., were essentially pure trans epimer, that fractions 49–74, 32 mg., were essentially pure cis epimer, and that fractions 39–48 consisted of a mixture of epimers. The latter could be further separated by repeated chromatography. Each epimer was dissolved in a few drops of dilute hydrochloric acid and the hydrochloride precipitated by addition of acetone. In this manner, there was obtained 50 mg. of methyl 6,8 - dideoxy - 6 - (trans - 1 methyl - 4 - butyl-L - 2 - pyrrolidinecarboxamido) - 1 - thio - D - erythro-α - D - galacto - octopyranoside hydrochloride, M.P. 135–137°, and about 150 mg. of methyl 6,8 - dideoxy-6-(cis - 1 - methyl - 4 - butyl - L - 2 - pyrrolidencarboxamido) - 1 - thio - D - erythro - α - D - galacto - octopyranoside hydrochloride, softening at 105° C. with further melting at 175–185° C.

The trans epimer recrysallized from the same solvent melted at 139–141° C. and had the following analysis:

Analysis.—Calcd. for $C_{19}H_{36}N_2O_6S \cdot HCl$: C, 49.93; H, 8.16; N, 6.13; S, 7.02. Found (corrected for 4.07% $H_2O$): C, 48.81; H, 8.54; N, 6.49; S, 6.67.

Similarly, recrystallization of the cis epimer gave a product softening at 108° C. and further at about 189° C. (solvated) with the following analysis:

Analysis.—Found (corrected for 4.95% water): C, 50.27; H, 9.00; N, 6.05; S, 6.65.

The trans epimer was about 2.2 times as active as lincomycin by S. lutea assay, about 2 times as active by the broth dilution assay, and 2.5 times as active in mice infected with S. aureus.

The cis epimer was about ½ to ⅓ as active as the trans epimer, being about equal to lincomycin.

(H1) METHYL 6,8-DIDEOXY-6-(1-ETHYL - 4 - BUTYL-L-2-PYRROLIDINECARBOXAMIDO)-1-THIO-D-ERYTHRO - α-D-GALACTO-OCTOPYRANOSIDE HYDROCHLORIDE

A mixture of 2.0 g. of methyl 6,8-deoxy - 6 - (4-butyl-L - 2 - pyrrolidinecarboxamido) - 1 - thio - D - erythro-α - D - galacto - octopyranoside hydrochloride from Part F, 1.5 ml. of acetaldehyde, 150 mg. of 10% palladium on carbon in 150 ml. of methanol was shaken under 35 lbs. of hydrogen pressure for 5.5 hours. The catalyst was removed by filtration to give a residue consisting chiefly of the cis and trans epimers of methyl 6,8-dideoxy - 6 - (1 - ethyl - 4 - butyl - L - 2 - pyrrolidinecarboxamido) - 1 - thio D erythro α - D - galacto-octopyranoside hydrochloride.

(H2) SEPARATION OF EPIMERS

As described in Part G2 the mixture of epimers of Part H1 (2 g.) was chromatographed over 200 g. of silica gel using for elution a solvent system of ethyl acetate, acetone, water (8:4:1). Fractions 33–42 by TLC were pure trans-epimer and were combined, fractions 49–64 were essentially pure cis-epimer and were also combined. Fractions 43–48 were a mixture of the epimers which could be purified by rechromatography. Each epimer was dissolved in a few drops of dilute hydrochloric acid and the crystalline hydrochloride precipitated on dilution with a large volume of ether.

The crude trans epimer fraction of 415 mg. gave 340 mg. (15.4%) of crystalline methyl 6,8 - dideoxy-6-(trans-1 - ethyl - 4 - butyl - L - 2 - pyrrolidinecarboxamido) - 1-thio - D - ehythro - α  D - galacto - octopyranoside hydrochloride, M.P. 144–151° C. Recrystallization from dilute acetone raised the M.P. to 148–151° C.

The cis epimer fraction of 645 mg. afforded 300 mg. (14.1%) of crystalline methyl 6,8 - dideoxy - 6 -(cis-1-ethyl - 4 - butyl - L - 2 - pyrrolidinecarboxamido) - 1-thio-D - erythro - α- D  galacto octopyranoside hydrochloride, M.P. 135–139° C. Recrystallization from dilute acetone gave crystals, M.P. 134–138° C.

The trans epimer isomer showed about 1–1.2 times the activity of lincomycin by the *S. lutea* assay, 2–4 times the activity of lincomycin against Gram-positive organisms, and 8 times or more the activity of lincomycin against Gram-negative organisms. In mice against *S. aureus* the trans epimer was about 2 times as active as lincomycin. The cis epimer was about ½ as active as the trans epimer.

Separation of the cis and trans isomers is not a necessary step as the 2-phosphates of the mixed epimers are useful per se. It is desirable, however, to keep the content of trans isomer high as this is the most active form. By carrying out the process with this in mind mixed epimeric products containing a ratio of trans and cis epimers of 3:1 to 1:5 can readily be obtained.

By substituting the formaldehyde and acetaldehyde of Parts G and H by other oxo compounds of the formula $R_4R_5CO$, for example, propionaldehyde, acetone, butyraldehyde, isobutyl methyl ketone, benzaldehyde, phenylacetaldehyde, hydrocinnamaldehyde, acetophenone, propiophenone, butyrophenone, 3-methyl - 4 - phenyl-2-butanone, 2-methyl-5-phenyl-3-pentanone, 3-cyclopentanepropionaldehyde, cyclohexaneacetaldehyde, cycloheptanecarboxaldehyde, 2,2-dimethylcyclopropaneacetaldehyde, 2,2-dimethylcyclopropyl methyl ketone, cyclopentyl methyl ketone, cyclobutyl methyl ketone, cyclobutanone, cyclohexanone, and 4-methylcyclohexanone, and using the appropriate alkyl, cycloalkyl, or aralkyl 6,8-dideoxy-6-(4-alkyl, 4-cycloalkyl-, or 4-aralkyl-L-2-pyrrolidinecarboxamido)-1-thio-D-erythro-α - D - galacto-octopyranoside, there are obtained the corresponding alkyl, cycloalkyl, and aralkyl 6,8-dideoxy-6-(1-$R_4R_5$CH-4-alkyl, 4-cycloalkyl-, and 4-aralkyl-L-2-pyrrolidinecarboxamido)-1-thio-D-erythro-α-D-galacto-octopyranosides which on treatment by the procedure of Example 1 give the corresponding alkyl, cycloalkyl, and aralkyl, 6,8-dideoxy-6-(1-$R_4R_5$CH-4-alkyl-, 4-cycloalkyl-, and 4-aralkyl-L-2-pyrrolidinecarboxamido)-1-thio-D-erythro-α-D-galacto-octopyranoside-2-phosphates where $R_4R_5$CH- is propyl, isopropyl butyl, and 4-methyl-2-pentyl; benzyl; phenethyl, 3-phenylpropyl, 1-phenylethyl, 1-phenylpropyl, 1-phenylbutyl, 3-methyl-4-phenyl-2-butyl, and 2-methyl-5-phenyl-3-pentyl; 3-cyclopentylpropyl, 2-cyclohexylethyl, cycloheptylmethyl, 2-(2,2-dimethylcyclopropyl)-ethyl, 1-(2,2-dimethylcyclopropyl)ethyl, 1-cyclopentylethyl, 1-cyclobutylethyl, cyclobutyl, cyclohexyl, and 4-methylcyclohexyl. By using formaldehyde and acetaldehyde or other alkanals, for example, propionaldehyde, butyraldehyde, valeraldehyde, or caproaldehyde with an alkyl 6,8-dideoxy-6-(4-alkyl-L-2 - pyrrolidinecarboxamido)-1-thio-D-erythro-α-D-galacto-octopyranoside where alkyl and 4-alkyl are methyl, ethyl, propyl, butyl, pentyl, or hexyl, preferred compounds of the formula:

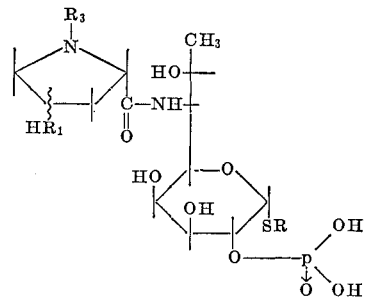

wherein R, $HR_1$, and $R_3$ are alkyl of not more than six carbon atoms, advantageously of not more than twelve carbon atoms in the aggregate, are obtained. Representative compounds of this formula are given in the following table:

TABLE I

| | R | $HR^1$ | $R_3$ |
|---|---|---|---|
| 5A | methyl | trans-ethyl | methyl |
| 5B | methyl | cis-ethyl | methyl |
| 5C Lincomycin-2-phosphate | methyl | trans-propyl | methyl |
| 5D Allolincomycin-2-phosphate | methyl | cis-propyl | methyl |
| 5E Lincomycin E-2-phosphate | methyl | trans-propyl | ethyl |
| 5F Allolincomycin E-2-phosphate | methyl | cis-propyl | ethyl |
| 5G | ethyl | trans-propyl | methyl |
| 5H | ethyl | cis-propyl | methyl |
| 5I | methyl | trans-butyl | methyl |
| 5J | methyl | cis-butyl | methyl |
| 5K | methyl | trans-propyl | ethyl |
| 5L | methyl | cis-propyl | ethyl |
| 5M | ethyl | trans-propyl | ethyl |
| 5N | ethyl | cis-propyl | ethyl |
| 5O | methyl | trans-butyl | ethyl |
| 5P | methyl | cis-butyl | ethyl |
| 5Q | methyl | trans-pentyl | methyl |
| 5R | methyl | cis-pentyl | methyl |
| 5S | ethyl | trans-butyl | ethyl |
| 5T | ethyl | cis-butyl | ethyl |
| 5U | methyl | trans-pentyl | ethyl |
| 5V | methyl | cis-pentyl | ethyl |
| 5W | ethyl | trans-pentyl | methyl |
| 5X | ethyl | cis-pentyl | methyl |
| 5Y | methyl | trans-hexyl | methyl |
| 5Z | methyl | cis-hexyl | methyl |
| 5AA | butyl | trans-propyl | methyl |
| 5AB | butyl | cis-propyl | methyl |
| 5AC | ethyl | trans-pentyl | ethyl |
| 5AD | ethyl | cis-pentyl | ethyl |
| 5AE | butyl | trans-butyl | ethyl |
| 5AF | butyl | cis-butyl | ethyl |
| 5AG | butyl | trans-pentyl | methyl |
| 5AH | butyl | cis-pentyl | methyl |
| 5AI | cyclohexyl | trans-propyl | methyl |
| 5AJ | cyclohexyl | cis-propyl | methyl |
| 5AK | butyl | trans-pentyl | ethyl |
| 5AL | butyl | cis-pentyl | ethyl |
| 5AM | pentyl | trans-pentyl | ethyl |
| 5AN | pentyl | cis-pentyl | ethyl |

EXAMPLE 6

*Methyl 6,8 - dideoxy-6-(trans-1-methyl-4-propyl-L-2-pyrolidinecarboxamido) - 1 - thio-L-threo-α-D-galacto-octopyranoside-2-phosphate (epilincomycin-2-phosphate).*

By substituting the lincomycin of Example 1 by epilincomycin, there is obtained epilicomycin-2-phosphate. The epilincomycin is prepared as follows:

(A) 3,4-O-ISOPROPYLIDENELINCOMYCIN

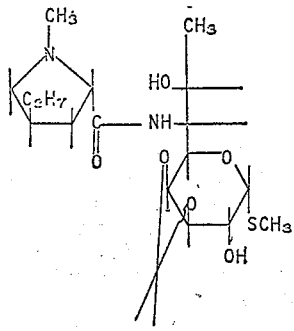

A solution of 9.8 g. of lincomycin in 150 ml. of acetone is added to a solution of 9.8 g. of p-toluenesulfonic acid monohydrate in 100 ml. of acetone with good stirring and avoidance of exposure to moisture. The mixture is stirred at ambient temperature for 1 hour, after which 100 ml. of anhydrous ether is added and stirring is continued in an ice-bath for 0.5 hour. The mixture is filtered and the solid is dried in vacuo at 50° C.; yield 13.35 g. (85.5%) of 3,4-O-isopropylidenelincomycin p-toluenesulfonate. An additional 1.15 g. (7.4%) can be recovered from the mother liquor by adding 350 ml. of anhydrous ether to the mother liquor from the previous filtering operation and chilling the solution for 1 hour. The 14.5 g. is obtained are suspended in 200 ml. of ether and shaken vigorously with 125 ml. of 5% potassium bicarbonate solution. The aqueous layer is back-extracted with two 100-ml. portions of ether. The ether extracts are washed with 50 ml. of saturated sodium chloride solution and then filtered through anhydrous sodium sulfate. The ether is evaporated under vacuum, leaving 7.9 g. (73.1%) of 3,4-O-isopropylidenelincomycin which is dissolved in 25 ml. of ether acetate and concentrated to about 10 to 15 ml. The concentrate is allowed to stand at room temperature for several hours and then refrigerated overnight. The crystals are filtered from the solution and washed sparingly with cold ethyl acetate; yield 4.55 g. (42.2%) of 3,4-O-isopropylidenelincomycin having a melting point of 126–128° C., and an optical rotation of $[\alpha]_D^{25}$ 101–102° (c., 1, methylene chloride).

(B) 7-DEHYDRO-3,4-O-ISOPROPYLIDENELINCOMYCIN

To a solution of 6 g. (0.0135 mole) of isopropylidenelincomycin in 75 ml. of pyridine was added 12 g. (excess) chromic oxide. The solution warms up about 20° C. After one hour the mixture was added to a solution containing 250 ml. each of ethyl ether and ethyl acetate. This was then filtered and evaporated to a syrup, 8.4 g. This syrup was distributed in a 500-transfer counter current distribution using the system, water:ethyl acetate:ethanol:cyclohexane (1:1:1:1). 7 - dehydro-3,4-O-isopropylidene-lincomycin was isolated as the peak fraction from tubes 330–380, K=2.45.

*Analysis.*—Calcd. for $C_{21}H_{36}N_2O_6S$: C, 56.72; H, 8.16; N, 6.30; S, 7.21. Found: C, 56.37; H, 7.62; N, 6.51; S, 6.84.

(C) 3,4-O-ISOPROPYLIDENE-EPILINCOMYCIN

To 1.6 g. of Craig-pure 7-dehydro-3,4-O-isopropylidenelincomycin in 75 ml. of methanol was added 400 mg. of sodium borohydride. After 1.5 hrs. this solution was evaporated to dryness on a rotary evaporator. The residue was added to 25 ml. of water and extracted three times with 25 ml. each of methylene chloride. The extract was back-washed with 15 ml. of water, then dried over magnesium chloride and evaporated to dryness. The residue, 1.4 g., was distributed in a 500-transfer counter current distribution using the solvent system, water:ethyl acetate:ethanol : cyclohexane (1:1:1:1)), and a single peak which fit the theoretical was observed at K=1.05. The material in tubes 240 to 280 was isolated as a syrup.

*Analysis.*—Calcd. for $C_{21}H_{38}N_2O_6S$: C, 56.47; H, 8.58; N, 6.27; S, 7.18. Found: C, 56.24; H, 8.54; N, 6.13; S, 7.01.

Thin layer chromatography (TLC) showed that this material consisted of two substances. One was 3,4-O-isopropylidenelincomycin; the other, 3,4 - O-isopropylidene-epilincomycin, moved slightly slower.

(D) EPILINCOMYCIN

The syrup from Part C was stored at room temperature 5 hrs. in a solution containing 60 ml. of 0.25 N hydrochloric acid and 40 ml. of ethanol. It was then kept at 0° C. for 4 days. Following neutralization with sodium bicarbonate, it was evaporated to 25 ml., then extracted with chloroform. The extract was washed with a little water and dried over magnesium sulfate, then evaporated to a residue. Thin layer chromatography of the residue showed two substances, both of which were active against *S. lutea*. The residue was chromatographed on a 14″ x ¾″ Florisil (a synthetic silicate of the type described in U.S. Patent 2,393,625) column which was eluted gradiently with solvent which varied continuously from 100% Skellysolve B (technical hexane) to 100% acetone. The total volume was 5000 ml. The two compounds were thus separated.

Fraction I: Tubes 53–65 (40 ml. cuts) epilincomycin. Assay 450 mcg./ml. (lincomycin assay).

*Analysis.*—Calcd. for $C_{18}H_{34}N_2O_6S$: C, 50.92; H, 8.55; N, 6.60; S, 7.56. Found: C, 50.19; H, 7.91; N, 6.05; S, 6.42.

Fraction II: Tubes 73–104 — lincomycin. Assay 950 mcg./mg.

By substituting lincomycin in this example by the appropriate lincomycin analogs, the corresponding epilincomycin-2-phosphate analogs of the formula

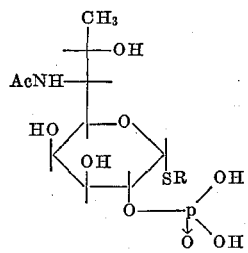

wherein Z, $R_1$, $R_2$, and $R_3$ of the Ac group and R are as given and illustrated above, are obtained. All the compounds that have been described above, therefore, have their counterpart in the opposite configuration, that is, the configuration derived from the 7-epi form. Also all the compounds described above have their counterpart in the 7(S)-chloro-7-deoxy, 7(R)-chloro-7-deoxy, 7(S)-bromo-7-deoxy, and 7(R)-bromo-7-deoxy analogs.

EXAMPLE 7

*Calcium lincomycin-2-phosphate*

A solution of 5.0 g. lincomycin-2-phosphate in 40 ml. water was mixed with a solution containing 1.47 g. calcium chloride and 5 ml. concentrated ammonium hydroxide. A voluminous white precipitate formed. The suspension was diluted with 40 ml. 95% ethanol and stirred for ½ hour. The product was isolated by filtration, washed with 20 ml. of a mixture of ethanol and water (1:1). After drying the sample under a stream of nitrogen, there was obtained 4.4 g. of calcium lincomycin-2-phosphate.

*Analysis.*—Calcd. for $CaC_{18}H_{33}N_2O_9PS$: C, 41.21; H, 6.34; N, 5.34; S, 6.11; P, 5.90; Ca, 7.64; $H_2O$, 10.27. Found (corrected for $H_2O$): C, 40.30; H, 6.25; N, 5.65; S, 5.78; P, 6.08; Ca, 7.32.

The calcium salt is insoluble in water but soluble in acid solutions. It has the advantage that it can be formulated in aqueous suspensions for oral administration. Other water-insoluble salts which can be made in like manner include strontium, magnesium, and aluminum salts.

Lincomycin-2-phosphate can be used for the same purposes and in the same dosages and dosage forms as lincomycin but because of its lack of the bitterness characteristic of lincomycin can be advantageously used in pediatric forms. For this purpose, it is advantageously used simply in aqueous solutions preferably with preservatives. Suitable pediatric formulations are given in the following examples.

EXAMPLE 8

*Aqueous solution*

|  | Mg. |
|---|---|
| Lincomycin-2-phosphate, M.P. 222–224° C. | 59.7 |
| Propyl paraben | 0.25 |
| Methyl paraben | 0.75 |
| Sorbic acid | 1.0 |
| Sodium hydroxide, 4 N aqueous, q.s. to pH 7.0–7.5. | |
| Water, deionized, q.s., 1.0 ml. | |

EXAMPLE 9

*Syrup*

An aqueous oral preparation containing 250 mg. equivalent of lincomycin base in each five milliliters is prepared from the following ingredients:

| | | |
|---|---|---|
| Lincomycin-2-phosphate | gm | 597 |
| Methylparaben, U.S.P. | gm | 7.5 |
| Propylparaben, U.S.P. | gm | 2.5 |
| Sorbic acid | gm | 10 |
| Saccharin sodium | gm | 12.5 |
| Cyclamate sodium | gm | 2.5 |
| Glycerin | ml | 3000 |
| Tragacanth powder | gm | 100 |
| Orange oil flavor | gm | 10 |
| F.D. & C. orange dye | gm | 7.5 |
| Sodium hydroxide, 4 N aqueous, q.s., pH 7.0–7.5 | | |
| Deionized water, q.s., 10,000 ml. | | |

In place of lincomycin-2-phosphate in Examples 8 and 9, there can be substituted 7(S)-chloro-7-deoxylincomycin-2-phosphate, as well as the water soluble salts of lincomycin-2-phosphate and 7(S)-chloro-7-deoxylincomycin-2-phosphate, for example, the alkali metal salts including the ammonium salt. Either the hemi-, mono-, or di-salt can be used.

The aqueous formulations of Examples 8 and 9 are particularly useful as pediatric preparations and can be administered orally in the same dosages as lincomycin. Administered orally to mice infected with *Staphylococcus aureus* the $CD_{50}$ for lincomycin-2-phosphate zwitterion and for lincomycin-2-phosphate hemi-ammonium salt was equal to or better than that for lincomycin hydrochloride.

We claim:
1. A compound of the formula:

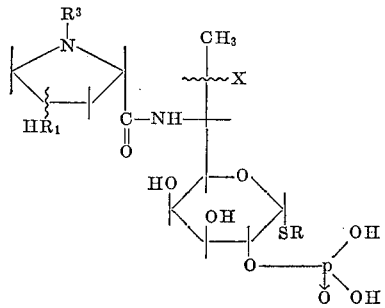

and the salts thereof, wherein X is OH, chlorine, or bromine; R and $HR_1$ are the same or different alkyl of not more than 20 carbon atoms, advantageously not more than 8 carbon atoms, cycloalkyl of from 3 to not more than 8 carbon atoms, or aralkyl of not more than 12 carbon atoms, advantageously not more than 8 carbon atoms; and $R_3$ is hydrogen, alkyl of not more than 20 carbon atoms, advantageously not more than 8 carbon atoms, cycloalkyl of from 3 to not more than 8 carbon atoms, and aralkyl of not more than 12 carbon atoms, advantageously not more than 8 carbon atoms.

2. The zwitterion form of the compound of claim 1.
3. The hemi-salt form of the compound of claim 1.
4. The hemi-ammonium salt form of the compound of claim 1.
5. A compound according to claim 1 having the formula:

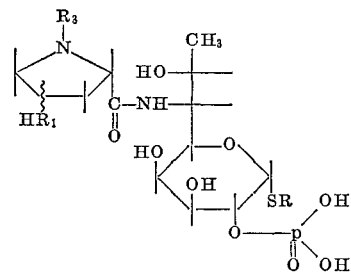

and the salts thereof wherein R, $HR_1$ and $R_3$ are as given in claim 1.

6. A compound according to claim 5 having the formula

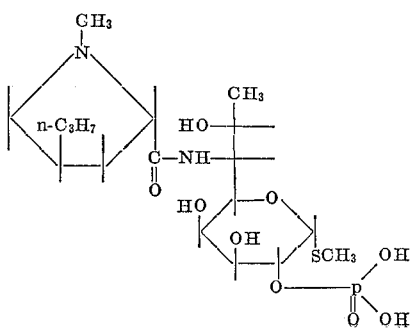

and the salts thereof.

7. A compound according to claim 5 having the formula

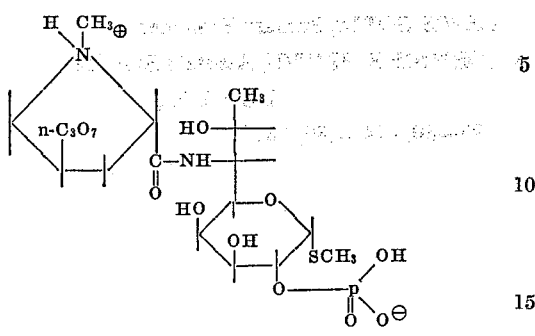

8. The hemi-ammonium salt of the compound according to claim 6.

9. A compound according to claim 1 having the formula

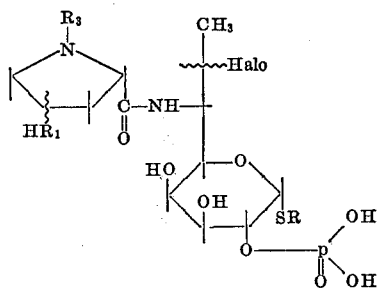

and the salts thereof, wherein halo is chlorine or bromine and R, HR₁, and R₃ are as given in claim 1.

10. A compound according to claim 9 having the formula

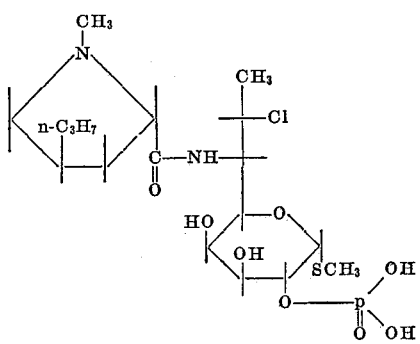

and the salts thereof.

11. A compound according to claim 9 having the formula

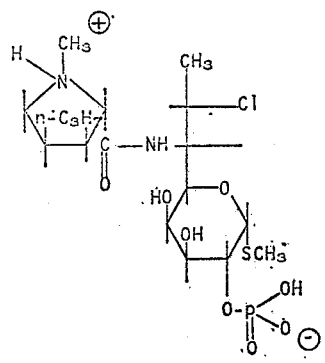

12. The hemi-ammonium salt of the compound according to claim 10.

13. A compound of the formula

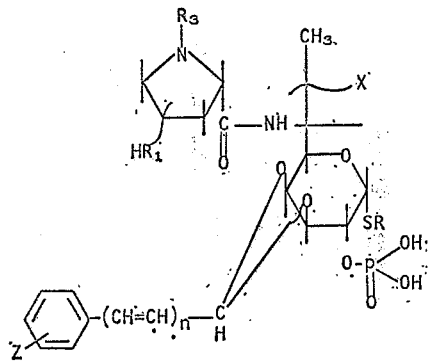

and the salts thereof wherein R, HR₁, and R₃ are as given in claim 1; Z is

| | |
|---|---|
| $CH_3$ | $OC_2H_5$ |
| $CH_2CH_3$ | $O(CH_2)_2CH_3$ |
| $CH(CH_3)_2$ | $OCH(CH_3)_2$ |
| $C(CH_3)_3$ | $O(CH_2)_4CH_3$ |
| $3,4\text{-}(CH_2)_4$ | $OC_6H_5$ |
| $C_6H_5$ | $OCOCH_3$ |
| $CF_3$ | $OH$ |
| $CN$ | $SCH_3$ |
| $COCH_3$ | $SC_2H_5$ |
| $CO_2C_2H_5$ | $SCH(CH_3)_2$ |
| $CO_2H$ | $SH$ |
| $CO_2$ | $SCOCH_3$ |
| $CH_2Si(CH_3)_3$ | $SCN$ |
| $Si(CH_3)_3$ | $SOCH_3$ |
| $Si(C_2H_5)_3$ | $SO_2CH_3$ |
| $Ge(CH_3)_3$ | $SO_2NH_2$ |
| $Ge(C_2H_5)_3$ | $S(CH_3)_2^\oplus$ |
| $Sn(CH_3)_3$ | $SO_3^\ominus$ |
| $Sn(C_2H_5)_3$ | $SeCH_3$ |
| $N_2^\oplus$ | $F$ |
| $NHCOCH_3$ | $Cl$ |
| $N(CH_3)_3$ | $Br$ |
| $NO_2$ | $I$ |
| $PO_3H^\ominus$ | $IO_2$ |
| $AsO_3H^\ominus$ | $CH{=}CHNO_2$ |
| $OCH_3$ | |

$n$ is zero or an integer from 1 to 4, inclusive; and X is chlorine, bromine, or a trityloxy radical of the formula

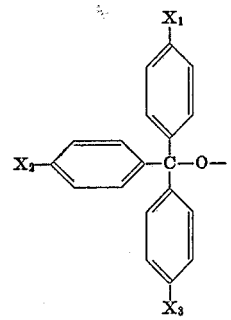

wherein $X_1$, $X_2$, and $X_3$ are hydrogen, halogen, or $OCH_3$.

14. A compound according to claim 13 wherein X is a trityloxy radical.

15. A compound according to claim 13 wherein X is a trityloxy radical, R and R₃ are methyl and HR₁ is trans-propyl.

16. A compound according to claim 13 wherein X is chlorine.

17. A compound according to claim 13 wherein X is chlorine, R and $R_3$ are methyl and $HR_1$ is trans-propyl.

References Cited

UNITED STATES PATENTS

| | | | |
|---|---|---|---|
| 3,282,920 | 11/1966 | Ouchi et al. | 260—211.5 |
| 3,288,780 | 11/1966 | Tsuchiya et al. | 260—211.5 |
| 3,290,285 | 12/1966 | Senoo et al. | 260—211.5 |
| 3,338,882 | 8/1967 | Wechter | 260—211.5 |

LEWIS GOTTS, Primary Examiner

JOHNNIE R. BROWN, Assistant Examiner

U.S. Cl. X.R.

195—80; 424—180, 181

PO-1050
(5/69)

UNITED STATES PATENT OFFICE
CERTIFICATE OF CORRECTION

Patent No. 3,487,068         Dated  December 30, 1969

Inventor(s)  Walter Morozowich

It is certified that error appears in the above-identified patent and that said Letters Patent are hereby corrected as shown below:

Column 3, line 9, change "N-methyl products" to read --N-desmethyl products--. Column 4, line 48, change "XVIII" to read --XVII--. Column 6, lines 65-70, the second half of the formula should read

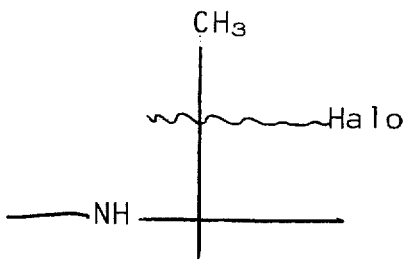

Column 7, line 16, change "of" to read --or--. Column 8, line 58, change "thionyl (v/v)" to read --thionyl chloride (v/v)--. Column 9, line 1, change "dithiocetals" to read --dithioacetals--. Column 10, line 25, change "formed" to read --forced--. Column 15, line 58, change "H$_2$/HD" to read --H$_2$/PD--, line 72, change "(Linocomycin" to read --(Lincomycin--. Column 16, lines 54-5, change "phenylphrine" to read --phenylephrine--. Column 18, line 28, change "phosptate" to read --phosphate--, line 31, change "visious" to read --viscous--. Column 22, line 2, change "carboxamide" to read --carboxamido--. Column 24, line 48, change "(8.85 f. - 0.02 mole)" to read --(8.85 g. - 0.02 mole )--. Column 30, line 6, change "(1-mehyl" to read --(1-methyl--. Column 31, line 12, change "ehythro" to read --erythro--. Column 33, line 45, change "is obtained" to read --so obtained--. Column 35, line 62, change "7-deovylincomycin" to read --7-deoxylincomycin--. Column 38, line 44, change "N(CH$_3$)$_3$" to read --N(CH$_3$)$_3$ $^+$--, lines 25-6, change "OCH(CH$_3$)$_2$       to read  --OCH(CH$_3$)$_2$
         O(CH$_2$)$_4$CH$_3$"                O(CH$_2$)$_3$CH$_3$
                                              O(CH$_2$)$_4$CH$_3$--

SIGNED AND
SEALED
MAR 2 1971

(SEAL)
Attest:

Edward M. Fletcher, Jr.
Attesting Officer

WILLIAM E. SCHUYLER, JR.
Commissioner of Patents